(12) United States Patent
Pykkonen et al.

(10) Patent No.: US 9,630,633 B2
(45) Date of Patent: Apr. 25, 2017

(54) APPARATUS AND METHOD FOR CONTROLLING A LOCOMOTIVE CONSIST

(71) Applicant: Bright Energy Storage Technologies, LLP, Arvada, CO (US)

(72) Inventors: Kevin Pykkonen, Boulder, CO (US); Jeffrey Orion Pritchard, Oakland, CA (US); Karl Ginter, Beltsville, MD (US); Scott Raymond Frazier, Morrison, CO (US)

(73) Assignee: Bright Energy Storage Technologies, LLP, Arvada, CO (US)

( * ) Notice: Subject to any disclaimer, the term of this patent is extended or adjusted under 35 U.S.C. 154(b) by 0 days.

(21) Appl. No.: 14/682,212

(22) Filed: Apr. 9, 2015

(65) Prior Publication Data

US 2015/0210168 A1 Jul. 30, 2015

Related U.S. Application Data

(63) Continuation of application No. 14/202,018, filed on Mar. 10, 2014, now Pat. No. 9,014,884.
(Continued)

(51) Int. Cl.
*B60L 11/02* (2006.01)
*B61C 17/12* (2006.01)
(Continued)

(52) U.S. Cl.
CPC ............... *B61C 17/12* (2013.01); *B60L 3/08* (2013.01); *B60L 11/02* (2013.01); *B61L 3/006* (2013.01); *B61L 15/0081* (2013.01); *Y02T 30/10* (2013.01)

(58) Field of Classification Search
None
See application file for complete search history.

(56) References Cited

U.S. PATENT DOCUMENTS 3,766,734 A 10/1973 Jones
5,907,193 A 5/1999 Lumbis
(Continued)

FOREIGN PATENT DOCUMENTS

JP 02290770 A 11/1990

OTHER PUBLICATIONS

PCT International Search Report and Written Opinion from PCT/US2014/022298, Jul. 2, 2014.

*Primary Examiner* — Truc M Do
*Assistant Examiner* — Jess Whittington
(74) *Attorney, Agent, or Firm* — Ziolkowski Patent Solutions Group, SC

(57) ABSTRACT

A locomotive assembly including a legacy locomotive controller and an intercept locomotive controller and a method of controlling a locomotive are disclosed. The locomotive assembly includes a power bus, a locomotive, and an intercept locomotive controller. The locomotive includes a primary power unit coupled to the power bus and a legacy locomotive controller programmed to transmit a control command to the primary power unit. The intercept locomotive controller is electrically coupled between the locomotive controller and the primary power unit and is programmed to intercept an initial locomotive control signal transmitted from the legacy locomotive controller to the primary power unit indicating an amount of locomotive power, modify the initial locomotive control signal, and transmit the modified control signal to the primary power unit.

19 Claims, 5 Drawing Sheets

Related U.S. Application Data

(60) Provisional application No. 61/799,474, filed on Mar. 15, 2013.

(51) Int. Cl.
  *B61L 3/00* (2006.01)
  *B61L 15/00* (2006.01)
  *B60L 3/08* (2006.01)

(56) References Cited

U.S. PATENT DOCUMENTS

| | | | |
|---|---|---|---|
| 5,950,967 A * | 9/1999 | Montgomery | B60L 15/32 246/122 R |
| 6,267,062 B1 | 7/2001 | Hamilton, Jr. | |
| 6,408,766 B1 | 6/2002 | McLaughlin et al. | |
| 6,520,124 B2 | 2/2003 | Bohm, II | |
| 6,591,758 B2 | 7/2003 | Kumar | |
| 6,877,581 B2 | 4/2005 | Badr et al. | |
| 6,937,925 B2 | 8/2005 | Smith | |
| 6,973,880 B2 | 12/2005 | Kumar | |
| 7,021,588 B2 | 4/2006 | Hess, Jr. et al. | |
| 7,021,589 B2 | 4/2006 | Hess, Jr. et al. | |
| 7,284,575 B2 | 10/2007 | Gram et al. | |
| 7,304,445 B2 | 12/2007 | Donnelly | |
| 7,627,416 B2 | 12/2009 | Batenburg et al. | |
| 7,971,538 B1 | 7/2011 | Miller et al. | |
| 8,294,285 B2 | 10/2012 | Hunter | |
| 2002/0174797 A1 | 11/2002 | Kumar | |
| 2002/0174798 A1 | 11/2002 | Kumar | |
| 2002/0189564 A1 | 12/2002 | Biess et al. | |
| 2004/0099256 A1 | 5/2004 | Stewart | |
| 2006/0012397 A1 | 1/2006 | Cooper | |
| 2006/0061307 A1 | 3/2006 | Donnelly | |
| 2006/0138285 A1 | 6/2006 | Oleski et al. | |
| 2008/0121136 A1 | 5/2008 | Mari et al. | |
| 2008/0148993 A1 | 6/2008 | Mack | |
| 2008/0223250 A1 | 9/2008 | Bachman | |
| 2008/0223251 A1 | 9/2008 | Bendig et al. | |
| 2009/0293759 A1 | 12/2009 | Schmitz | |
| 2009/0293760 A1 | 12/2009 | Kumar et al. | |
| 2009/0314179 A1 | 12/2009 | Kumar | |
| 2010/0019103 A1 | 1/2010 | Kane et al. | |
| 2010/0148581 A1 | 6/2010 | Gupta et al. | |
| 2010/0212539 A1 | 8/2010 | Iden | |
| 2011/0041723 A1 | 2/2011 | Kumar | |
| 2011/0106401 A1 * | 5/2011 | Kumar | B61L 3/006 701/102 |
| 2011/0309206 A1 | 12/2011 | Smith | |
| 2012/0303237 A1 | 11/2012 | Kumar et al. | |
| 2013/0079959 A1 * | 3/2013 | Swanson | B60W 20/00 701/19 |
| 2013/0173143 A1 | 7/2013 | Biagini | |

* cited by examiner

APPARATUS AND METHOD FOR CONTROLLING A LOCOMOTIVE CONSIST

CROSS REFERENCE TO RELATED APPLICATIONS

The present invention is a continuation of and claims priority to U.S. Non-Provisional patent application Ser. No. 14/202,018, filed Mar. 10, 2014, which claims priority to U.S. Provisional Patent Application Ser. No. 61/799,474, filed Mar. 15, 2013, the disclosures of which are incorporated herein by reference in their entireties.

BACKGROUND OF THE INVENTION

A locomotive consist is the arrangement of locomotives, slugs, and power tenders which are coupled together to provide motive power to a train. In one known arrangement, multiple independent locomotives are linked together using multiple-unit ("MU") controls and operated as a single unit. Locomotives traditionally used in MU arrangements are powered by diesel-electric power sources, where a diesel engine drives a generator to produce electric power. The electricity produced by these engine-generator sets is in turn used to power one or more electric traction motors. The traction motors turn the drive wheels of the locomotive.

The locomotive controllers provided on traditional locomotives, referred to herein as "legacy locomotive controllers", recognize and control fixed engine-generator combination(s) installed on the locomotive chassis. This arrangement of locomotives has an independent legacy locomotive controller for each locomotive chassis, and shares throttle setting (an input to a locomotive controller), brake settings, and fault indications, which are communicated using a combination electrical and pneumatic connection. Each legacy locomotive controller manages a static, predefined arrangement of one or more engine/generator sets that provide power to the bus, and the generation of tractive effort by traction motors that use the provided electricity. These locomotive controllers also manage fuel use and efficiency, emissions production, and other aspects of the locomotive operation. MU controls relay throttle and brake instructions from a first locomotive (master or "A" units) to one or more second locomotives (slaves or "B" units), where these instructions are independently interpreted by the respective locomotive controller and tractive effort is provided independently by each locomotive of a consist. MU locomotives operate independently and do not share power or engine control signals, nor do they permit a first locomotive controller to make requests of a second locomotive controller. Similarly, legacy locomotive controllers of locomotives operating in MU fashion do not share operational data and do not make operational decisions about the operations of a first locomotive controller based upon the operational characteristics of the second locomotive controller.

Legacy locomotives comprise those locomotives which do not have a locomotive controller that is able to manage multiple simultaneous power generation sources. Legacy locomotives which support multiple simultaneous power generation sources are called "genset" locomotives, as described above.

FIG. 1 is a block schematic diagram illustrating a typical legacy DC locomotive system 10. The DC locomotive system 10 includes two control loops: an engine control loop 12 and an electrical-power control loop 14. These control loops are implemented by legacy locomotive controller 16. A legacy locomotive controller 16 is an analog electromechanical assembly, a digital microcontroller-based control system that implements these control loops, or a combination of these technologies. A throttle or "Notch" setting or notch request 18 is set by the operator and is an input to the legacy locomotive controller 16. In the engine control loop 12, the Notch setting 18 is an encoded request for a particular locomotive power setting and is used by the legacy locomotive controller 16 to calculate a set-point for engine speed. The engine control loop 12, implemented by the legacy locomotive controller 16, is responsible for tracking and managing that speed. The electrical control loop 14 of legacy locomotive controller 16 uses the Notch setting 18 to determine a power set-point. The legacy locomotive controller 16 then manages the electrical output power of the engine/generator combination to that power set-point. Collectively, these systems are called "legacy locomotive control systems".

The high-level schematic diagram for a typical AC locomotive is very similar to that shown in FIG. 1 with the exception that instead of the DC bus wiring directly to DC motors, the power source for the AC induction motors is controlled by a separate AC controller. The AC controller is responsible for distributing power (and reducing it during knockdowns). In an AC locomotive, the DC bus voltage is stored on capacitors which ensure stable power while the AC induction inverters switch the power to the wheels. Thus, for an AC locomotive, the power control portion is similar to that of a DC locomotive.

Legacy locomotive controllers can be generally characterized as outputting engine control voltages (e.g., RPM and generator excitement voltages), receiving sensor input of operational information (e.g., sensor readings indicating actual engine RPM, some fault information, and, in some cases, power bus sensor readings), and then acting to adjust the operation of the engine by varying its control voltages. In locomotives that include multiple engine-generator sets, the legacy locomotive controller manages the locomotives engines and provides power blending by controlling the amount of power and voltage provided by each engine to the common power bus, which permits the provided power to be combined on the power bus.

Legacy locomotive controllers are constructed with a basic assumption that the power sources that they control are provided in a fixed arrangement. If a legacy locomotive controller is unaware of multiple possible power sources, then the use of an external power tender can only be provided on an "all or nothing" basis, where the power tender directly substitutes for the engine-generator on the locomotive chassis. Given the complex nature of locomotive control and the interrelatedness of locomotive loads such as traction motors and blowers, a locomotive's controller, its engine-generator, and an external power tender cannot "share" the generation requirement, with a portion of the power coming from the engine-generator, and remainder of the power coming from the external power tender without the legacy locomotive controller being aware of the power tender and the amount of power it produces. As just one example, the heat generated by the locomotive's electric traction motor must be continuously rejected from the motor apparatus to prevent motor damage and catastrophic failure including fires in the worst cases. In order to reject this heat from the traction motors, locomotives use forced air blower systems to pass air through the internal structure of each traction motor. The power to turn the traction motor blowers comes from the locomotive diesel engine in either mechanical or electrical form. In both instances, the drive speed of the motor blowers is related to the operating speed or power output of the locomotive and adjusting the locomotive diesel engine to compensate for power provided from external sources will reduce the cooling of the traction motors without reducing their actual load (and heat generation).

If the legacy locomotive controller is not programmed to be aware of an additional power source programmed to deliver power to the bus, the legacy locomotive controller will recognize the additional power available on the locomotives power bus and either fault, mis-control one or more power sources or loads, or even turn off the locomotive's engine-generator. In addition, the addition of unexpected auxiliary power sources may result in improper control of other locomotive systems tied to the locomotive engine-generator or to the amount of power being used by locomotives loads (e.g., blowers, auxiliary power), thereby resulting in a non-functioning locomotive.

While some legacy locomotive controllers have been configured to control static arrangements of dissimilar power sources (such as an engine-generator, fuel cell, gas turbine, or batteries) in an effort to reduce emissions and fuel costs, extend locomotive limits, and improve the efficiency of locomotive power, these static arrangements have failed due to the lack of operational flexibility required for day-to-day operation of locomotives and/or operational limitations (such as locomotive range, power production limitations, and requiring support for multiple fuel sources).

Further, the legacy locomotive controllers of existing diesel engines are configured with built-in assumptions regarding the power curve and engine settings (e.g., RPM, generator excitement) that are used to produce specific power/voltages. These operating assumptions are violated by physical limitations induced by separating the power tender from the locomotive chassis (as described above), and by logical considerations that power tenders may have different operating parameters and settings (e.g., differing engine type, characteristics, fuels). In current configurations, power tenders and locomotive controllers must be operated as a single, non-varying consist because of inherent limitations in the locomotive control and the lack of locomotive controller knowledge of differing power tenders and each power tenders instructions and operational characteristics. The lack of flexibility of these older control systems prohibits the use of newer, more desirable, power sources capable of operating with alternative fuel sources and limits operational flexibility made available by swapping out of service units (which takes an entire locomotive/power tender combination out of service).

Newer locomotive power control systems have evolved from electro-mechanical to digital controls offering a variety of new options for power control that perform the same functions as the older electro-mechanical control systems, as well as add new power management and train control functions in order to improve performance and fuel efficiency. However, the cost and technical integration challenges of retrofitting these digital controllers to pre-existing (legacy) locomotives is problematic and are often prohibitive. Generally, this retrofit requires the wholesale replacement of the locomotive control system and some of the locomotive control circuits, as well as substantial modifications to the locomotive engine, generator, and other electrical components on the locomotive. Furthermore, these types of changes typically cause a reclassification of the locomotive and require recertification of the locomotive power plant for safety and emissions. The recertification process requires that the engine emissions be updated to current EPA requirements, which adds additional cost. Combined, these costs are prohibitive.

In light of the above, it would be advantageous to maintain the ability to operate an existing locomotive engine using the fuel for which it was originally designed while adding the ability provide extra power to that locomotive from an auxiliary power source.

It would further be desirable to design an apparatus and method for providing an auxiliary power source for a locomotive that can be integrated with existing electro-mechanical locomotive controls to provide the benefits of being able to incorporate power from alternative fuel sources without replacing or reprogramming the pre-existing locomotive controller.

It would also be desirable to design an apparatus and method that effects proper control of locomotive systems tied to the locomotive engine-generator, such as traction motors and traction blower motors, when an auxiliary power source is used to deliver power to the locomotive power bus.

BRIEF DESCRIPTION OF THE INVENTION

Embodiments of the invention overcome the aforementioned drawbacks by providing a method and apparatus for retrofitting a legacy locomotive control system with an intercept locomotive controller to enable the use of situational-appropriate auxiliary power sources and permit railroad locomotives to make cost-advantaged use of alternative power sources when it is cost effective to do so without reprogramming or replacing the existing legacy locomotive controller.

Embodiments of the invention relate generally to the management of locomotives utilizing one or more auxiliary power units and, more particularly, to a method and apparatus for equipping an existing locomotive with an intercept locomotive controller designed to manage auxiliary power sources and interface with the existing legacy locomotive controller of the locomotive.

In accordance with one aspect of the invention, a locomotive assembly includes a power bus, a locomotive, and an intercept locomotive controller. The locomotive includes a primary power unit coupled to the power bus and a legacy locomotive controller programmed to transmit a control command to the primary power unit. The intercept locomotive controller is electrically coupled between the locomotive controller and the primary power unit and is programmed to intercept an initial locomotive control signal transmitted from the legacy locomotive controller to the primary power unit indicating an amount of locomotive power, modify the initial locomotive control signal, and transmit the modified control signal to the primary power unit.

In accordance with another aspect of the invention, a method of controlling a locomotive includes relaying an initial locomotive control signal from a legacy locomotive controller designed to control at least one power source on the locomotive to an intercept locomotive controller, the initial locomotive control signal comprising an encoded request for a locomotive power setting. The method also includes determining a power output corresponding to the locomotive power setting and allocating the power output between the at least one power source on the locomotive and an auxiliary power source. The method further includes transmitting a modified locomotive control signal to the at least one power source on the locomotive based on the power output allocation, the modified locomotive control signal different from the initial locomotive control signal and transmitting an auxiliary command signal to the auxiliary power source based on the power output allocation.

In accordance with yet another aspect of the invention, a computer readable storage medium having stored thereon a computer program comprising instructions which, when executed by at least one processor, cause the at least one processor to receive an initial locomotive power setting command from a locomotive controller, the initial locomotive power setting command indicating a desired tractive power. The instructions also cause the at least one processor to modify the initial locomotive power setting command and transmit the modified locomotive power setting command to a locomotive power source. The instructions further cause the at least one processor to receive a sensor signal corresponding to the modified locomotive power setting command, modify the sensor signal to match an expected sensor signal for the initial locomotive power setting command, and transmit the expected sensor signal to the locomotive controller.

These and other advantages and features will be more readily understood from the following detailed description of preferred embodiments of the invention that is provided in connection with the accompanying drawings.

BRIEF DESCRIPTION OF THE DRAWINGS

The drawings illustrate preferred embodiments presently contemplated for carrying out the invention.

In the drawings.

DETAILED DESCRIPTION

Figure 1:
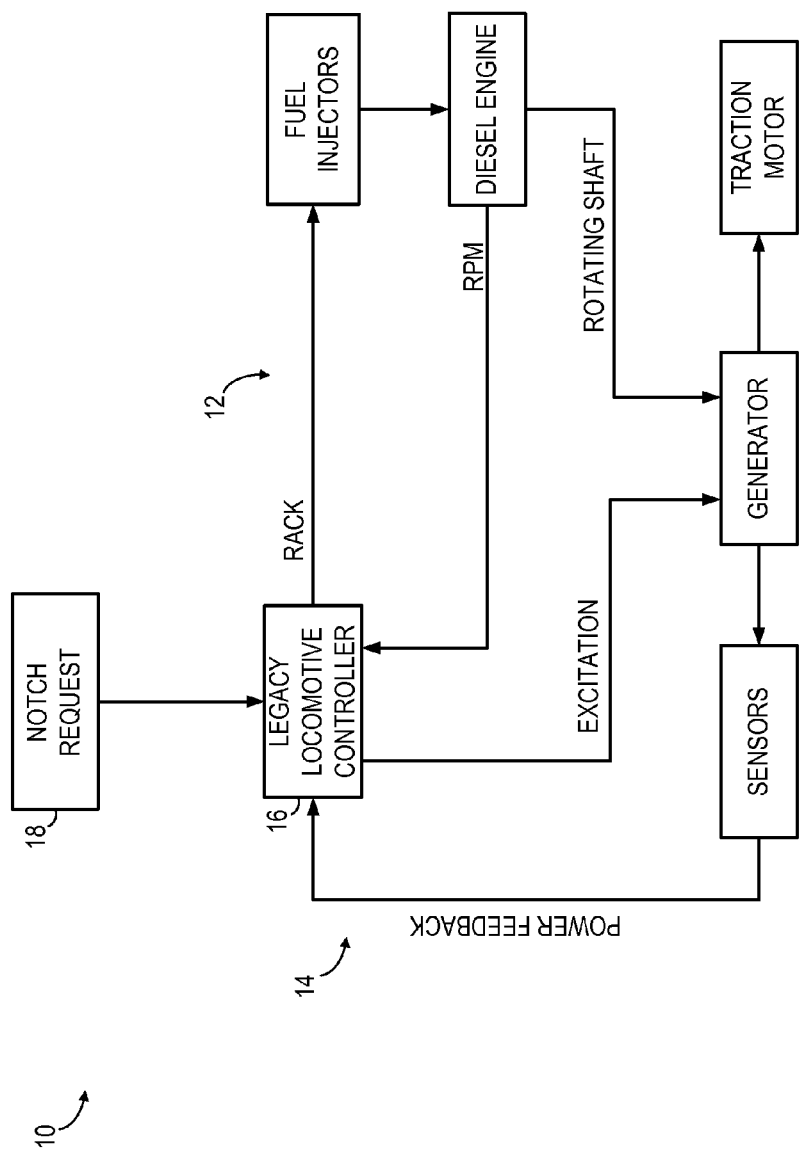
FIG. 1 is a schematic block diagram illustrating a control system of a prior art diesel genset locomotive.

Embodiments of the invention disclosed herein include an "intercept" locomotive controller integrated within the existing control circuitry of the control system of a legacy locomotive, such as legacy locomotive 10 of FIG. 1. As described in detail below, the intercept locomotive controller receives control and sensor inputs from a variety of sources, including one or more pre-existing locomotive controller outputs, such as, for example Notch settings, and provides sensor or other outputs to pre-existing locomotive controller inputs and locomotive power or other locomotive equipment. Using the output signals received from the legacy controller, the intercept locomotive controller recalculates the power allocation between the legacy locomotive engines and to one or more auxiliary power units and transmits differing signals to the legacy locomotive engines and to one or more auxiliary power units. The intercept locomotive controller also receives signals from sensors on the locomotive and sensors located on one or more auxiliary power unit (APU) assemblies coupled to the locomotive and synthesizes those signals into signals expected by the legacy locomotive controller.

Because the intercept locomotive controller is configured to intercept both signals output from the legacy locomotive controller and signals input to the legacy locomotive controller, such as sensor inputs for example, the intercept locomotive controller can interoperate with the existing legacy locomotive controller without making modifications to the existing legacy locomotive controller or replacing the legacy locomotive controller with a "genset" style locomotive controller that has been modified to interoperate with one or more removable auxiliary power units. Therefore, this "intercept" controller architecture has the advantage of enabling legacy locomotives to interface with auxiliary power units and operate with lower costs and with reduced emissions, and without incurring large retrofit expenses or recertification costs. Also, when auxiliary power is not available, the intercept locomotive controller can pass the signals through directly without modification to their legacy destination and the legacy locomotive will work in its original factory mode.

Figure 2:
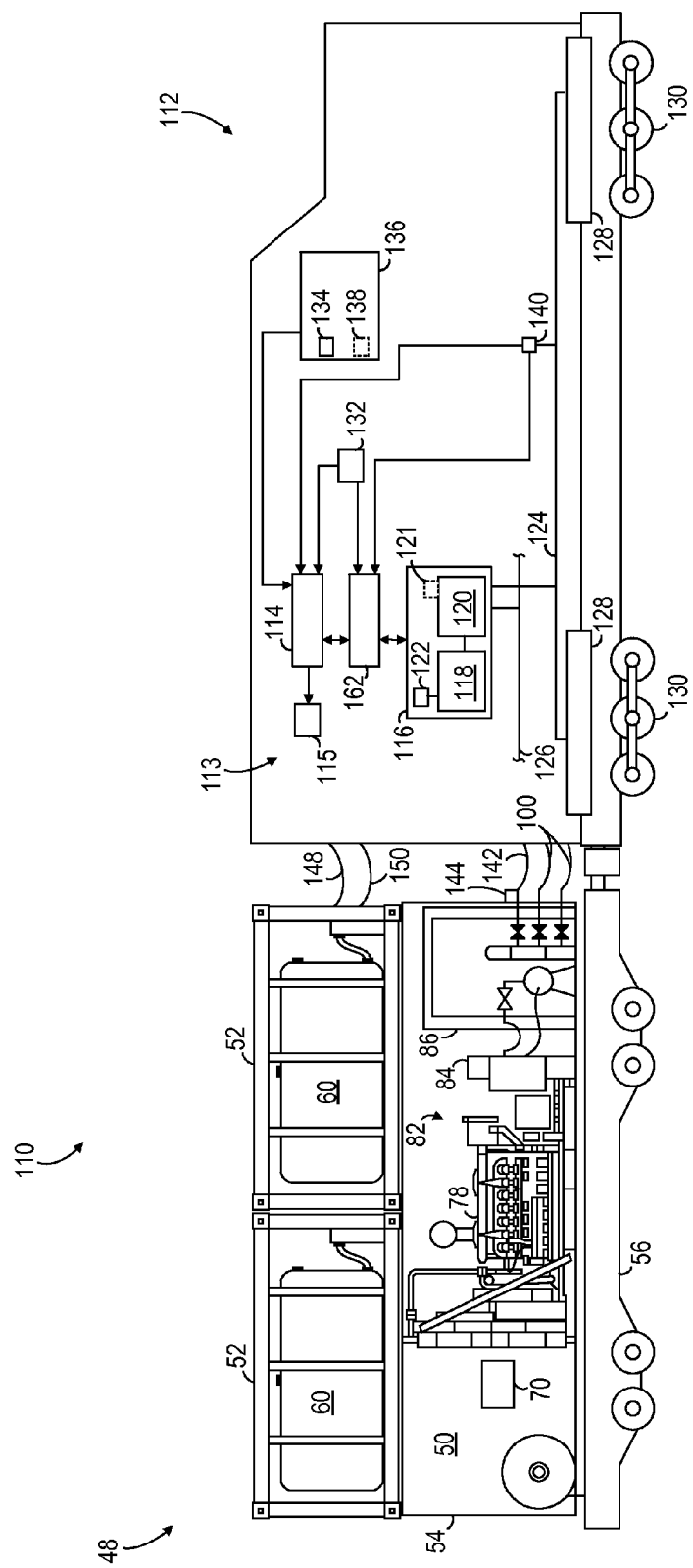
FIG. 2 is a schematic diagram of a locomotive assembly including a legacy locomotive with an intercept locomotive controller and an auxiliary power unit assembly, in accordance with an embodiment of the invention.

Referring now to FIG. 2, a locomotive consist or locomotive assembly 110 that includes an intercept locomotive controller 162 is illustrated according to one embodiment of the invention. As shown, locomotive assembly 110 includes a locomotive 112 that is coupled to auxiliary power unit assembly 48 via power and control cables 100, 142. A locomotive consist is defined for purposes herein as an arrangement of locomotives and auxiliary power units, coupled together, which share control and power connections between at least one locomotive and at least one auxiliary power unit. For purposes of illustration, several exemplary configurations of consists may be defined as follows:

A-B Consist: One locomotive coupled to one auxiliary power unit. The auxiliary power unit provides at least some, but not all, of the electrical power required by the locomotive.

A-B-A Consist: Multiple locomotives are coupled to one auxiliary power unit. The auxiliary power unit provides a least some, but not all, of the electrical power required by each of the locomotives.

A-B-B Consist: One locomotive is coupled to multiple auxiliary power units. The auxiliary power units together provide at least some of the electrical power required by the locomotive.

Referring first to the locomotive portion of the locomotive assembly 110 of FIG. 2, locomotive 112 includes a locomotive control system 113 having a legacy locomotive controller 114 and an intercept locomotive controller 162. Similar to legacy locomotive controller 16 (FIG. 1), legacy locomotive controller 114 is configured to manage a predefined arrangement of one or more fixed locomotive engine-generator sets 116 designed to operate in response to received control signals from legacy locomotive controller 114. Such predefined and static operating arrangements may be stored within legacy locomotive memory 115. The number of engines/generator sets 116 included within locomotive 112 and the associated control inputs and outputs are simplified for clarity in this illustration. As such, while locomotive 112 is illustrated as including a single locomotive engine-generator set 116, locomotive 112 may include additional fixed power sources according to various embodiments. The legacy locomotive controller 114 provides a plurality of control inputs and outputs between the legacy locomotive controller 114, the engine/generator set 116, and various sensors 122, 140 that monitor the operation of the engine/generator set 116, the traction bus 124, and fraction motors 128, as described in additional detail below.

Locomotive engine-generator set 116 includes a respective diesel engine 118, generator 120, and sensor system 122. While element 120 is described as a generator herein, alternators may be substituted for generators in the power generation system as understood by those skilled in the art. Generator 120 produces electricity for delivery to a DC locomotive fraction bus 124 and an auxiliary power bus 126. According to one embodiment, generator 120 is excited through a silicon controlled rectifier (SCR) 121 (shown in phantom). In an alternative embodiment, generator 120 is excited using a pulse-width-modulated (PWM) signal. Generator 120 is configured to convert the mechanical energy provided by engines 118 into a form acceptable to one or more traction motors 128 (DC or AC type) configured to drive the plurality of axles coupled to the driving wheels 130 of locomotive 112, and to provide DC or AC power to the respective auxiliary power bus 126. According to one embodiment, traction motors 128 are cooled via a traction motor blower 204 (FIG. 4), which may be coupled to a power take off of diesel engine 118 or powered by electrical power derived from diesel engine 118, according to various embodiments.

In traditional legacy locomotive engine configurations, locomotive engine-generator set 116 is operated in response to a throttle position input sensor 134 which indicates the position of the throttle as controlled by the operator on an operator interface 136. Operator interface 136 may also include an optional operator engine start input 138 (shown in phantom) where the operator can directly or indirectly instruct legacy locomotive controller 114 (e.g., via a keypad (not shown)) with regard to operation of engines 118 or termination of operation of the engines 118.

The intercept locomotive controller 162 is positioned between the equipment control inputs of legacy locomotive controller 114 and its locomotive subsystems (e.g., engines, generators, sensors, traction motor controllers, collectively referred to herein as "locomotive equipment") through one or more interfaces. The intercept locomotive controller 162 receives equipment control inputs originally directed to the legacy locomotive controller 114 or other locomotive equipment and outputs synthesized values to the respective legacy locomotive controller 114 and locomotive equipment to effect the control of integrated locomotive equipment and APUs 50. These control inputs include information transmitted from user interface 136 to legacy locomotive controller 114 and information transmitted to legacy locomotive controller 114 from power sensors 140 and locomotive engine/generator sensors 122 that provide information in the form of analog electromagnetic signals and/or digital signals, which are read by (and converted to appropriate form by) the intercept locomotive controller 162. According to various embodiments, intercept locomotive controller 162 includes circuitry to convert the digital and analog signals to/from a form usable by the intercept locomotive controller 162. As one skilled in the art will recognize, this "intercept" paradigm may be extended to the control of any locomotive equipment as well as to the control of external locomotives (using an MU interface). The various input and output interfaces of intercept locomotive controller 162 are illustrated and described in more detail with respect to FIGS. 3 and 4.

Power sensors 140 on the locomotive traction bus 124 and auxiliary power bus 126 coupled to intercept locomotive controller 162 through control and sensor circuits provide information on the amount of power actually being provided on the busses 124, 126 and/or to traction motors 128. These sensors are well known by those skilled in the art and may provide digital, analog, or a combination of digital and analog outputs to intercept locomotive controller 162.

Locomotive 112 also includes an engine start and stop control 132 which interfaces with legacy locomotive controller 114. In some embodiments, the engine start and stop control 132 is also connected to the intercept locomotive controller 162 and the intercept locomotive controller 162 provides a synthesized engine start and stop control input to the legacy locomotive controller 114, as described in more detail below with respect to FIG. 4.

As shown in FIG. 2, locomotive 112 is connected to an auxiliary power unit assembly 48, which includes an auxiliary power unit (APU) 50 that is designed to interface with one or more locomotives, such as a diesel locomotive and one or more interchangeable gaseous fuel assemblies 52. As used herein, "gaseous fuel" means fuels in liquid or gaseous state (depending upon current temperature and pressure), where the fuel is normally in a gaseous state at standard temperature and pressure. In many cases, these fuels are hydrocarbons such as natural gas, propane, or syngas. Gaseous fuel may also be, for example, compressed or liquefied hydrogen, producer gas, methane, butane, and the like. In the embodiment shown, auxiliary power unit assembly 48 includes one or more fuel assemblies 52 stacked atop the container 54 housing APU 50, which is secured to a rail car 56. However, one skilled in the art will recognize that fuel assemblies 52 and APU 50 may be arranged in other configurations in alternative embodiments. As described in detail below, APU 50 provides additional power to the connected locomotive(s) 112 in the locomotive consist 110 under direction of at least one intercept locomotive controller 162. As used herein, the term "auxiliary power unit" or "APU" is used to refer to an autonomously controlled device capable of generating and supplying tractive power to a locomotive. The term "autonomous," as used herein, refers to an APU that able to act independently and control the internal operations of the APU independently in response to external requests, and wherein the internal workings of the APU are opaque or unknown to external control systems. Autonomous APUs and associated fuel assemblies are described in additional detail in U.S. Non-Provisional patent application Ser. No. 13/838,787, which is incorporated by reference herein.

APU 50 includes an auxiliary engine-generator set 82 having an engine 78 and an auxiliary alternator or generator 84 that is electrically connected to an electrical manager 86, which manages the electricity generated by APU 50 and provides that electricity to a specific locomotive 112 via a power cables 142. When APU 50 is connected to more than one locomotive at a time, multiple electrical managers (one per connected locomotive) may be used in order to electrically isolate each locomotive. In operation, APU controller 70 receives and responds to requests from locomotive control system 113 and may also provide periodic or asynchronous notifications to locomotive control system 113. For example, APU controller 70 may report the presence or status of APU 50 to locomotive control system 113, provide identifying information about one or more aspects of APU 50 (e.g., its identification type, a serial number), its engines 78 (e.g., engine type, rated horsepower, serial number), and the attached fuel assemblies 52 (e.g., fuel assembly ID, date of last pressure test). The APU controller 70 may further report the amount of power the APU 50 is able to generate in response to a power request. APU controller 70 also receives signals from sensors 71 located within APU 50 and may also receive instructions, such as a start request, an emergency stop request, and a power request from locomotive control system 113, as described in additional below.

Figure 4:
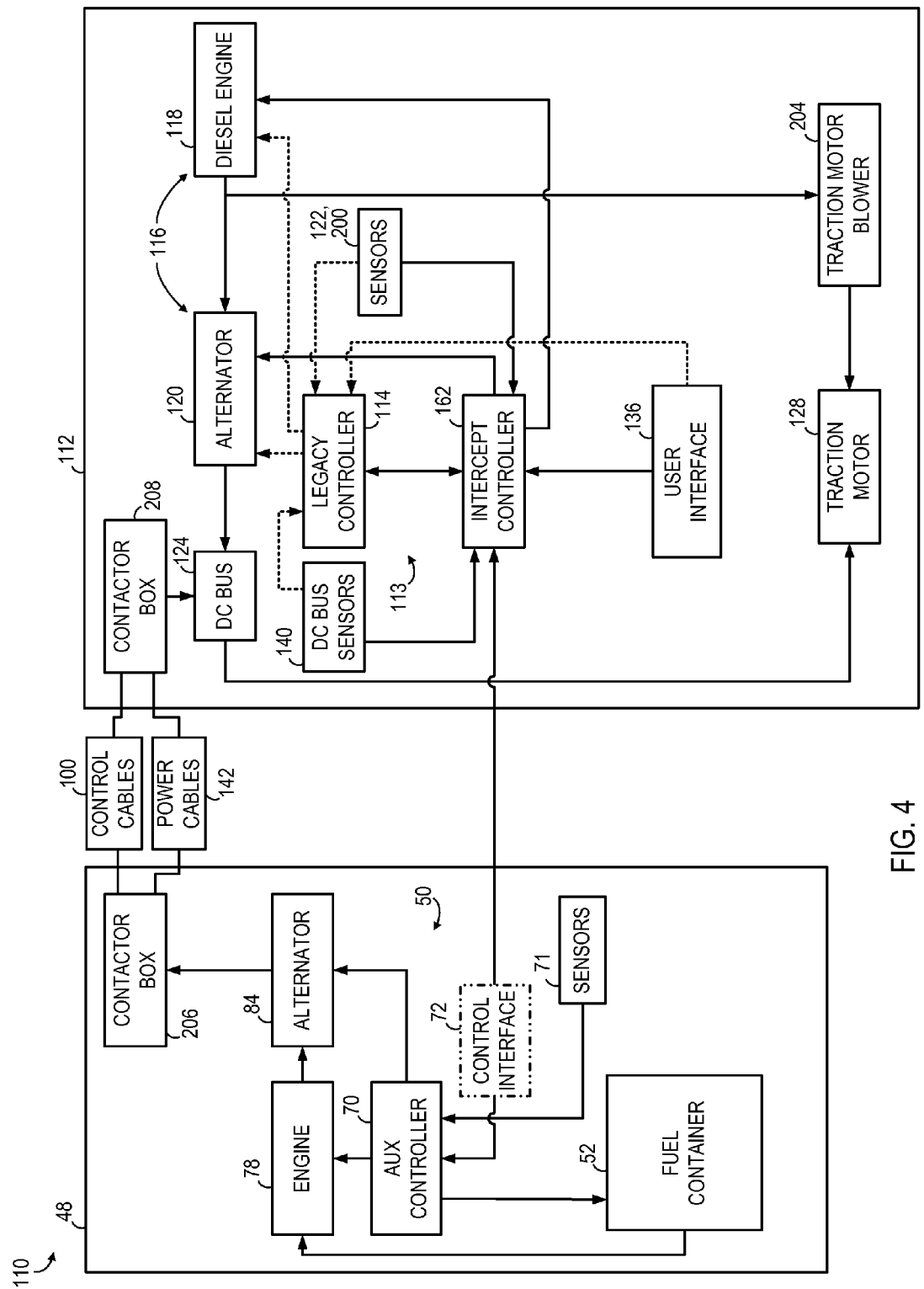
FIG. 4 is a schematic block diagram of select components of the locomotive assembly of FIG. 2, in accordance with an embodiment of the invention.

Optionally, APU 50 may be configured to provide identifying information to intercept locomotive controller 162 via an optional control interface 72 (shown in phantom in FIG. 4). This identifying information includes identifying information from APU 50 as well as identifying information from fuel assemblies 52 coupled to APU 50. Identifying information may include an equipment configuration of APU 50, the amount and/or cost of power that is currently being generator and/or can be generated by the APU 50, and a cost of fuel within the pressure tanks 60 of fuel assembly 52 as examples. Based on the identifying information received from APU 50 and a current total power demand of locomotive 112, intercept locomotive controller 162 makes a determination as to how to allocate power generation between locomotive engine-generator sets 116 and auxiliary power unit 50. According to one embodiment, APU 50 is programmed to periodically transmit identifying information to intercept locomotive controller 162, such as, for example, (as a notification) at predefined time intervals. Intercept locomotive controller 162 may also communicate with one or more fuel assemblies 52 (as optional locomotive equipment or via an APU 50 interface), which provide gaseous fuel to one or more of the locomotive engines 118 and/or APU 50. Fuel assemblies 52 also provide sensor information regarding fuel state, fuel type, and fuel costs to intercept locomotive controller 162.

Output power generated by auxiliary generator 84 is delivered to DC bus 124 of locomotive 112 via power cables 100 and control cables 142, which are coupled between APU assembly 48 and locomotive 112 via respective contactor boxes 206, 208. The number of control cables 100 is determined based on design specifications for the amperage and interconnection between locomotive 112, APU 50, and fuel assemblies 52. As shown in FIG. 2, a disconnect sensor 144 is coupled to power cables 142, which electrically connect locomotive 112 and APU 50. Disconnect sensor 144 is configured to sense a connection status of APU 50 with locomotive traction bus 124. Should a decoupling occur between locomotive 112 and rail car 56 and/or a disconnection occur between power cables 142 and locomotive traction bus 124, disconnect sensor 144 will transmit an alert signal to at least one of APU controller 70, legacy locomotive controller 114, and intercept locomotive controller 162 indicating the disconnection.

In some embodiments, intercept locomotive controller 162 provides APU control instructions on an optional dedicated APU control interface 72 (shown in phantom in FIG. 4). In a preferred embodiment, this control interface 72 provides signaling that is electromagnetic interference (EMI) resistant (e.g., CANbus). In other embodiments, control cables 100 may include converters (described above) that convert locomotive controller engine control voltages (e.g., RPM, generator excitement) to/from EMI resistant signaling means. In other embodiments, control cables 100 may include converters (not shown) to convert locomotive controller engine control voltages (e.g., RPM, generator excitement) to APU controller instructions. These converters may be implemented individually or in series as desired to provide a signaling path between the intercept locomotive controller 162 and APU control interface 72.

The intercept locomotive controller 162 is optionally connected to one or more fraction bus sensors 140 and meters via control and sensor circuits. These sensors and meters monitor the amount of power placed on the traction bus 124 by an APU 50. Similarly, an intercept locomotive controller 162 may provide a control circuit effective to control the operation of an APU 50. When connected in this way, the controller 70 of APU 50 may receive instructions from the intercept locomotive controller 162 to provide a specific amount power to the locomotive traction bus 124 and/or the auxiliary power bus 126. For clarity of illustration, the connections are shown for a single external power unit or APU 50. Sensors, meters, and control circuits may be replicated for each APU 50 if a plurality of APUs 50 are utilized. Any control and/or sensor circuit may optionally be electrically connected to a common control and sensor interface (not shown), which is electrically connected to intercept locomotive controller 162 in order to minimize the number of discrete control and sensor circuits.

Figure 3:
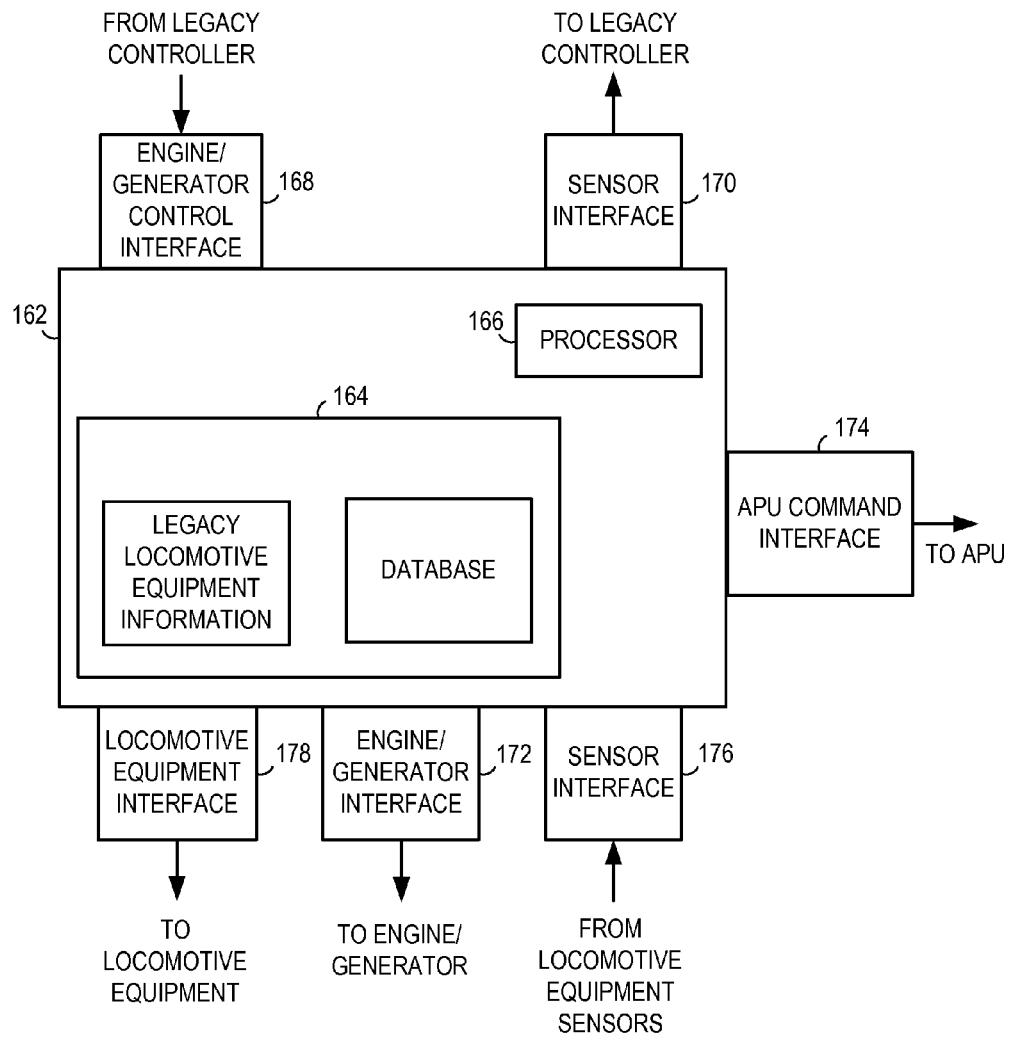
FIG. 3 is a schematic diagram of an exemplary intercept locomotive controller usable with the locomotive assembly illustrated in FIG. 2.

Referring now to FIGS. 3 and 4, the control system configuration and operation of intercept locomotive controller 162 are described according to various embodiments of the invention. As referenced above and described in detail below, the intercept locomotive controller 162 is positioned between a legacy locomotive controller 114 and its locomotive equipment, and receives and processes legacy locomotive controller instructions to the engines, alternator/generators, traction motor controllers, and other locomotive equipment, and transmits the same or altered instructions to the locomotive equipment and one or more APUs 50. The intercept locomotive controller 162 also receives responses and sensor inputs from one or more APUs and locomotive equipment, integrates these responses, synthesizes any necessary information within processor 166, and presents the integrated and/or synthesized information to the legacy locomotive controller 114. According to various embodiments, intercept locomotive controller 162 is operable with digital, analog, or a combination of both digital and analog control and sensor inputs and outputs.

Intercept locomotive controller 162 includes various interfaces that permit the intercept locomotive controller 162 to perform electronic monitoring, control, and reporting of locomotive and APU operation. For example, intercept locomotive controller 162 includes one or more receive engine interfaces 168, which are connected to the legacy locomotive controller 114 and receive engine and/or alternator/generator settings from the legacy locomotive controller 114. Collectively, these signals encode an amount of power requested by the legacy locomotive controller 114 of a power source, such as, for example, a specific engine and alternator/generator pair. According to various embodiments, intercept locomotive controller 162 may include one or more receive engine interfaces 168 depending upon the number of power sources the legacy locomotive controller 114 is controlling. Intercept locomotive controller 162 further includes one or more send sensor interfaces 170, which are connected to sensor inputs of the legacy locomotive controller 114. The intercept locomotive controller 162 sends synthesized sensor values to the legacy locomotive controller 114 using this interface 170.

Intercept locomotive controller 162 also includes one or more send engine/generator interfaces 172, which are connected to the control inputs of the locomotive engine(s) 118 and generator(s) 120. It is over these interfaces 172 that the intercept locomotive controller 162 configures the engine and generator settings of the locomotive engines 118. Intercept locomotive controller 162 further includes at least one APU command interface 174, which is operably connected to an APU 50 as described herein. The intercept locomotive controller 162 communicates with one or more APUs 50 over this interface 174.

Interfaces 172 and 174 connect interface locomotive controller 162 to engine/generator sets 116 and APUs 50 using control and sensor circuits constructed to convert the digital and/or analog signals from the respective power sources to/from a form usable by the intercept locomotive controller 162. In some implementations, interface 172 leverages control and sensor circuitry that is a portion of pre-existing wiring already present in the locomotive 112. In some implementations, the engine control circuitry includes engine RPM control circuits, the generator control circuitry comprises generator excitation control circuitry, and sensor inputs include engine RPM and generator output readings. Note that although the sensor inputs are illustrated as a single circuit, alternative embodiments may include a plurality of circuits.

Intercept locomotive controller 162 additionally includes one or more receive locomotive sensor input interfaces 176, which are operably connected to DC traction bus sensors 140 as well as one or more additional sensors 200 on the locomotive 112. According to various embodiments, the number of locomotive sensor input interfaces 176 may vary based on the number of sensors the legacy locomotive controller 114 is provided with. Additional locomotive sensors 200 may include, as non-limiting examples, such sensors as overheat, engine RPM, fraction motor temperature sensors, traction motor power usage sensors, auxiliary bus power sensors, and the like. Optionally, the sensor inputs may include an interconnection to the interface and/or user interface of the MU, which permits the intercept locomotive controller 162 to receive control inputs from sources using the MU and/or user interface components (e.g., a throttle, brake level, or user interface panel)

The intercept locomotive controller 162 further optionally includes one or more send locomotive equipment interfaces 178 connected to locomotive equipment such as traction motors, traction motor controllers, or other locomotive equipment interfaces that are operably connected to the locomotive equipment in order to permit the intercept locomotive controller 162 to control one or more locomotive equipment components. Optionally, the send locomotive equipment interfaces 178 may include an interconnection to the MU interface and/or user interface 136 of the locomotive 112, which permits the intercept locomotive controller 162 to send control information to other locomotives using the MU and/or user interface components (e.g., a user interface panel). While intercept locomotive controller 162 is illustrated in FIG. 3 as including five interfaces, one skilled in the art will recognize that the number of interfaces may be varied based on design specifications and system configuration.

Intercept locomotive controller 162 also includes one or more memories 164 within which intercept locomotive controller 162 may store identifying information used to uniquely identify legacy locomotive controllers 114 to which it is connected. This information may be used for the intercept locomotive controller 162 to configure its inputs and outputs, and to configure power allocation and similar algorithms. Intercept locomotive controller 162 also may store information regard standardized and specific locomotive equipment characteristics. For example, standardized information about locomotive equipment characteristics may include a power curve specific to one or more classes of engines, information describing generating and/or power capacity of one or more classes of auxiliary power unit assemblies, acceptable fuel types for use with a particular auxiliary power unit, shutdown delay interval, sensor types and value ranges/meaning, and the like. Similarly, intercept locomotive controller 162 may store specific information about the locomotive within which it is installed, such as connected locomotive equipment as well as operating requirements, parameters, control instructions, etc. associated with the respective locomotive equipment. For example, the information may include a list of attached locomotive engines/generators, their capabilities and power curves, fuel efficiency metrics for each of the specific engines, sensors connected and their expected values and ranges (and meanings of these values), and the like.

Intercept locomotive controller 162 may also store information about one or more classes of auxiliary power units and/or a specific auxiliary power units, including the capabilities of classes of auxiliary power units (e.g., capability, interconnect requirements, cost of power, fuel types) and specific instances of auxiliary power units. Specific information stored may include information about one or more aspects of a particular auxiliary power unit assembly (e.g., its identification type, a serial number), its engines (e.g., engine type, rated horsepower, serial number), and the attached fuel assemblies (e.g., fuel assembly ID, date of last pressure test), the cost of power provided by the auxiliary power unit assembly, any limits on the use of power from auxiliary power unit assembly, and information related to the operation of auxiliary power unit assembly, including historical sensor readings, power produced and delivered, and operation, inspection, and use history.

Within memory 164 of intercept locomotive controller 162, one or more configuration tables are stored. These configuration tables include instructions for communicating with specific types and models of engine/generators, external power units, sensors, and locomotive control units, including control parameters, input and output value ranges, and other related information. The memory 164 of intercept locomotive controller 162 may also include input/output interface parameters that are used to associate specific interfaces with the intercept locomotive controller control logic, any adjustments in value used to interface to those interfaces, and similar information. In some implementations, the memory 164 of intercept locomotive controller 162 may further include control strategy information which is used by the intercept locomotive controller 162 to allocate power requirements across multiple power sources. For example, a simple control strategy might be to run the legacy locomotive engine/generator set 116 at idle in order to produce power for the auxiliary bus 126, and supply all other power requirements from the APU 50.

Memory 164 of intercept locomotive controller 162 may include an internal database of legacy locomotive control systems and equipment, including engine/generator classifications and settings, legacy locomotive controller information, sensor types, etc. This information is used by the intercept locomotive controller 162 to configure its responses to inputs and to properly configure its outputs. For example, the intercept locomotive controller database may include information on one or more legacy locomotive controller types, which may provide information as to its control outputs (which are connected to the intercept locomotive controller inputs), their expected values, and any expected responses and/or sensor values. The database may also associate a specific control regime or control plan for use with a specific legacy locomotive controller. Similarly, the intercept locomotive controller database may include information about:

a) engine/generator combinations, including control specifications for engine/generator settings required to produce specific power levels, expected sensors and sensor values associated with specific engine/generator performance, etc.,
b) APU settings/command interface specifications, including APU identification databases, APU class performance characteristics, APU command interface and response settings, including APU interface and protocol specifications for communicating (e.g., sending commands, receiving responses) with one or more APUs,
c) traction motor controller settings and related sensor values, including communication protocols used, control formats and settings to instruct a fraction motor controller, and expected sensor values and their control interpretations for traction motors (temperature, power used, etc.),
d) fuel types and energy contents, for use with managing removable fuel assemblies,
e) fuel assembly communications parameters, including communication protocols used, control formats and settings to instruct a fuel assembly controllers, and expected sensor values and their control interpretations,
f) operating plan, including power allocation plans as described below, and
g) locomotive equipment configurations, including type of equipment, corresponding inputs and output interfaces of the intercept locomotive controller 162, and conversion information.

In one embodiment, intercept locomotive controller 162 is a PLC or microcontroller, along with associated memories and volatile registers and as well as the associated digital and analog interfaces in order provide control electronics for the electronic monitoring, control and reporting of locomotive engine/generators and sensors.

Referring now to FIG. 4 and with continued reference to FIG. 2 and FIG. 3, the operation of intercept locomotive controller 162 within the context of the locomotive consist 110 is set forth. The legacy correlation between primary engine RPM (or throttle setting) and the amount of electricity generated is stored within legacy locomotive controller 114. Legacy locomotive controller 114 manages the amount of apparent power present on the busses 124, 126 by requesting changes in engine RPM and generator excitation (e.g., by changing the control signals) and by measuring the amount of power reported by the intercept locomotive controller 162 as being present on the various busses 124, 126. Legacy locomotive controller 114 also calculates and manages locomotive location and anticipated power needs and issues adjusted power configurations to the locomotive equipment. These adjusted power configurations are intercepted by the intercept locomotive controller 162 and further adjusted to integrate the use of one or more APUs 50.

In operation, intercept locomotive controller 162 periodically receives engine/generator control signals indicating requested engine RPM and generator excitation from legacy locomotive controller 114 through engine control interface 168. Whether the engine control signal received is continuous or episodic depends upon the engine/generator(s) 118, 120 and legacy locomotive controller 114 installed in the locomotive. Upon receipt of an engine/generator control signal, intercept locomotive controller 162 compares the current state and value(s) of the engine/generator control signal(s) against a previous state of the engine/generator control signal(s) to determine if one or more of the values have changed from previous settings. If there are no differences from the previous engine/generator control signal(s), then the intercept locomotive controller 162 does not initiate any changes in its settings. If, on the other hand, there are changes in the engine/generator control signal(s) received, the intercept locomotive controller 162 may take one or more of the following actions:

A) look up the engine control interface type in an intercept locomotive controller 162 memory to determine the meaning of the control signal(s) received. This permits the intercept locomotive controller 162 to calculate the amount of power the legacy controller 114 is requesting from the respective engine/generator set 116;
B) calculate the change in power requested, and perform a power allocation (or other) operation between two or more power sources, such as, for example, engine/generator set 116 and APU 50 as described herein;
C) store the results of the power allocation (or other) operation for subsequent use in processing sensors; and
D) output engine/generator control signals and APU control signals to the send engine/generator interface 172 and to the APU control interface 72 via interface 174 in accordance with the results of the power allocation operation in order to cause the power sources to provide the allocated amount of power or perform other operations.

Similarly, the intercept locomotive controller 162 intercepts signals from power sensors 140, and locomotive engine/generator sensors 122 that indicate operational information for the locomotive control system 113, such as, for example, on the amount of power actually provided by APUs 50, and the settings and/or operational conditions of other locomotive equipment, and the status and/or operation of locomotive engine-generator set 116 (e.g., various parameters of engine 118 such as revolutions-per-minute (RPMs), operating power output, temperature and other engine operating parameters). The intercept locomotive controller 162 receives this information through sensor interface 176, integrates the information to an integrated set of sensor values (possibly changing their values or providing synthesized values), and forwards the integrated and synthesized sensor reading(s) to the legacy locomotive controller 114 and locomotive equipment through sensor interface 170. The intercept locomotive controller 162 permits the legacy locomotive controller 114 and existing locomotive equipment (e.g., locomotive engine generator set 116) to operate as "normal", while providing additional features such as the integration of one or more APUs 50 to the locomotive consist 110.

Whether the sensor signal received by intercept locomotive controller 162 through sensor interface 176 is continuous or episodic, or in analog or digital form, may vary depending upon the sensor being monitored. Upon receipt of an engine/generator control signal, the intercept locomotive controller 162 compares the current state and value(s) of the sensor signal(s) against a previous state of the sensor signal. If there are no differences from the previous sensor signal(s), then the intercept locomotive controller 162 does not initiate any changes in its settings. If there are changes in the sensor signal received, the intercept locomotive controller 162 takes the following steps:

A) look up the sensor information describing the sensor values and meanings;
B) determine other sensor input values expected, and obtain sensors values for those sensors as well;
C) create a synthesized sensor value from the input values consistent with the expected sensor output to the legacy locomotive controller 114;
D) output the synthesized sensor value to the appropriate send sensor interface 170 (as determined by the locomotive equipment (sensor) configuration information stored in the intercept locomotive controller 162); and E) execute power allocation or other controller functions to manage the locomotive equipment in conjunction with one or more APUs 50.

As one example, intercept locomotive controller 162 receives signals from DC bus sensors 140, engine-generator sensors 122 and, optionally, other locomotive sensors 200. The sensor values from the DC bus sensors 140, engine-generator sensors 122, and other locomotive sensors 200 are compared against the operating plan of the intercept locomotive controller 162 (and adjustments are made to settings if necessary), and the sensor values are combined to produce synthetic sensor values for transmission to the legacy locomotive controller 114 indicating that the locomotive engine/generators 118, 120 are producing the requested or desired amounts of tractive power.

Intercept locomotive controller 162 includes an Excitation Split module and a Feedback Join module as part of its control logic. The Excitation Split module of intercept locomotive controller 162 takes the excitation requests from the legacy locomotive controller 114 received via engine interface 168, determines the power equivalents of the excitation requests from a configuration table, performs a power allocation process, and distributes the power allocation instructions between one or more APUs 50 and one or more diesel generator/alternator sets 116 of the locomotive 112. The Excitation Split module also uses as an input values from the APU 50 that indicate the available power from the APU 50 and from the configuration information of the intercept locomotive controller 162, which identifies the excitation/RPM/power produced information for each engine/generator set 116.

The Excitation Split module uses the available power from the APU 50 to determine how much of the excitation request to distribute to each of the engine/generator set 116. The nominal case is to distribute as much power as possible to the APU 50. Some embodiments may make alternate determinations based upon emissions requirement, fuel costs, etc. If the APU 50 is not present, the available power from the APU is zero and the Excitation Split module distributes all excitation requests to the available diesel engine/generator sets 116. In this instance, the intercept locomotive controller 162 is fully backwards compatible with the legacy diesel-only system.

The Feedback Join module of intercept locomotive controller 162 sums the currents from the alternator 120 and other power sensors connected to the intercept locomotive controller 162 and provides an integrated (synthesized) signal to legacy locomotive controller 114. The legacy locomotive controller 114 thus functions identically to how it did before. The function of the legacy locomotive controller 114, which is to compare the system power against the power set-point, remains unchanged with the addition of intercept locomotive controller 162.

According to various embodiments, the multiple power sources included within locomotive consist 110, including locomotive engine-generator set(s) 116 and APUs 50, may be configured to add energy to the DC bus 124 via passive rectification, active rectification, and/or DC Bus Pulse Width Modulation, as described below. Each of these methods assume a parallel bus architecture. Alternative embodiments using a series circuit involve wiring the alternators in series would require that every alternator we add be capable of passing the entire system current, which may make the alternator prohibitively expensive and large. When using a series circuit, there are no rectifiers to contend with, the final power given to the system is simply the current multiplied by the sum of voltages of each generator 120.

In one embodiment, power from locomotive engine-generator set(s) 116 and APUs 50 are shared on the DC bus 124 using passive rectification. In this implementation, the electrical systems of the APU 50 is configured similarly to the electrical system of the locomotive 112, such as, for example, a rectified fraction alternator feeding DC bus 124. The field coil to the APU 50 is driving by a pulse-width-modulated chopper circuit that can excite the APU 50 and that is not subject to the waveform phase delays that a silicon controlled rectifier (SCR) system is. In this embodiment, whichever generator has the highest voltage at any particular time is the one driving the DC bus 124. Since there is ripple of about 15% in the rectified voltage of the DC output, multiple power sources will drive some power if their voltage is within 15% of the highest voltage source.

In another embodiment, power sharing between locomotive engine-generator set(s) 116 and APUs 50 is effected through active rectification. In this embodiment, an AC-DC converter having a voltage rating on the kilovolt scale and a power rating on the megawatt scale is included within locomotive assembly 110. The voltage of each APU 50 is controlled through active rectification with the target voltage being enough to drive the desired proportional power of the system. Excitation requests from the Feedback Split module of intercept locomotive controller 162 step up the voltage of the APU 50 while lack of excitation requests slowly lowers the voltage.

Power sharing may also be implemented between locomotive engine-generator set(s) 116 and APUs 50 through a high-voltage, high-power switch provided on each APU 50. The APUs 50 are then operated at a voltage that is higher than the voltage of the DC bus 124. Excitation requests from the Feedback Split module of intercept locomotive controller 162 close the switch momentarily and DC power flows from the higher-voltage APU 50 onto the DC bus 124. Modulating the system determines how much energy is added to the DC bus 124.

One important aspect of handing the APU controller 70 is response time to requests from the intercept locomotive controller 162. Locomotive controllers operate in very short duration control loops, and response time of APUs to locomotive controller requests is important to the successful operation of a locomotive control with an autonomous APU 50. Accordingly, in one embodiment the APU controller 70 provides response times to requests received from the intercept locomotive controller 162 within a configuration defined amount of time or be considered non-responsive. A non-responsive APU controller would be considered a fault condition by the intercept locomotive controller 162 and be handled accordingly. Some locomotive controller requests may contain an indication that the request should be handled quickly (e.g., within 10 msec, 100 msec, 1 sec, or 10 sec, depending upon the type of change), such as power removal requests being generated in conjunction with wheel slip or fault events. Other operational issues, such as fuel amounts crossing a lower threshold, chassis temperature or alarms, for example, can be handled more slowly. Still other operations, particularly those that include communications interactions with fuel assemblies or lengthy calculations, may complete in 10 or more seconds.

In one embodiment, the locomotive consist 110 may be operated to blend power generated from the APU 50 and engine/generator sets 116. Blending power is advantageous when the transition of power must be seamless, when the locomotive control system 113 operates with a limited rate of control changes, or when one power source has operational characteristics (e.g., response time) where changes in power provided cannot be reflected within operationally acceptable response times.

In such an embodiment, a second power source can be configured to "follow" a first power source in accordance with a power allocation plan. For example, if a first power source has a high electrical inertia compared to a second power source, changes in electric power demands that require quick responses (such as wheel slip responses) may be preferentially allocated to the power source that is able to more quickly respond, followed by an optional follow-up set of power reallocation to balance loads between the power sources to more fuel efficient and/or cost effective power allocations.

For example, if the APU 50 responds more slowly to a change in power than locomotive engine/generator, changes in power demand will be handled by the locomotive control system 113, with power allocation and subsequent commands to the APU 50 and request to the locomotive's engine/generator occurring at different times. The locomotive control system 113 may first configure the engine/generator set 116 of the locomotive 112 to quickly produce a differing amount power in response to a changed power request (either up or down) in order to meet the received power request, followed by a subsequent APU controller 70 commands to change the amount of power generated by the APU 50, followed by an (optional) third change in the locomotive engine/generator settings to "trim" the amount of power provided to the locomotive consist 110 to again match the original power request (in light of the changed APU power generation in response to the APU commands). If the response times/inertial response of the power units differ, the order and timing of requests and commands may vary.

In some embodiments, the intercept locomotive controller 162 is programmed to operate in accordance with one or more defined operating plans, which instruct the intercept locomotive controller 162 on how to perform power allocations. The operating plan(s) may be implemented in the control logic of the intercept locomotive controller 162, as a program element implemented by the processor 166 of the intercept locomotive controller 162, implemented as a control plan executed by the logic of intercept locomotive controller 162 and stored in a memory 164 or as part of the operating plans of the internal database of memory 164.

According to one embodiment, the operating plan of intercept locomotive controller 162 is defined as a look-up table that allocates power between the legacy engine 118 and APU 50 based upon an input of requested engine RPM. As one example, illustrated in TABLE 1 below, the intercept locomotive controller 162 outputs two values based on the received engine RPM input: an RPM for the legacy engine 118 and a power setting for the APU 50.

TABLE 1

| Input | Output | |
|---|---|---|
| Engine RPM | Legacy engine RPM | APU setting |
| 164 | 164 | 0 kW |
| 400 | 164 | 152 kW |
| 500 | 350 | 400 kW |
| 600 | 400 | 600 kW |
| 700 | 450 | 800 kW |
| 800 | 500 | 1000 kW |

According to another embodiment, the operating plan of intercept locomotive controller 162 is defined as a look-up table, such as, for example, TABLE 2 below, that changes the excitation voltage of legacy locomotive engine 118 to reduce load (and power output) while keeping RPMs raised in order to support direct drive operation.

TABLE 2

| Input | Output | | |
|---|---|---|---|
| Engine RPM | Legacy engine RPM | Excitation Voltage | APU setting |
| 164 | 164 | 5.0 V | 0 kW |
| 400 | 350 | 4.0 V | 152 kW |
| 500 | 400 | 3.0 V | 400 kW |
| 600 | 450 | 2.0 V | 600 kW |
| 700 | 500 | 1.0 V | 800 kW |
| 800 | 600 | 0.5 V | 1000 kW |

An exemplary interface definition table that describes the actions of the intercept locomotive controller 162 with respect to intercept and forwarding of sensor values is provided in TABLE 3 below, in accordance with one embodiment of the invention. As described in additional detail below, TABLE 3 defines the sensors connected to various receive sensor interfaces of the intercept locomotive controller 162, and the actions to be taken by the intercept locomotive controller 162 under various operating conditions. It is contemplated that the intercept locomotive controller 162 additionally may take other actions to manage the locomotive 112 and/or APU 50 as described herein.

Initially, it is contemplated that the multiple receive engine interfaces and receive locomotive equipment interfaces listed TABLE 3 below may be incorporated within respective multi-input interfaces provided on intercept locomotive controller 162 or individual input interfaces, such as, for example, control interface 168 (FIG. 3) and sensor interface 176, according to alternative embodiments. Further, according to various embodiments the sensor signals listed in the Disposition column of TABLE 3 may be forwarded from a common send sensor interface, such as send sensor interface 170 (FIG. 3), or from a number of individual send sensor interfaces provided on intercept locomotive controller 162.

TABLE 3

| Line | Sensor ID | Control-Report Model | Interface | Disposition |
|---|---|---|---|---|
| 1 | Engine RPM instructions | Cummins | Receive Engine Interface 1 | On change, calculate power requested, allocate power to consist |
| 2 | Generator excitement instruction | Cummins | Receive Engine Interface 2 | On change, calculate power requested, allocate power to consist |
| 3 | Fault | MU | Receive Locomotive Equipment 0 | Poll 1s, on change, process fault |
| 4 | Traction Motor Temperature | Temp Sensor | Receive Locomotive Equipment 1 | Poll 1s, on change, send to send sensor interface |

TABLE 3-continued

| Line | Sensor ID | Control-Report Model | Interface | Disposition |
|---|---|---|---|---|
| 5 | Traction Motor Draw | PowerSensor | Receive Locomotive Equipment 2 | On change, calculate reported power, set value to calculated power and send to send sensor interface |
| 6 | DC bus power | PowerSensor | Receive Locomotive Equipment 3 | On change, recalculate power provided, send calculated power to send sensor interface |
| 7 | Engine 1 RPM | Cummins | Receive Locomotive Equipment 4 | On change, recalculate power, send calculated RPM to send sensor interface, process power change |
| 8 | Generator 1 voltage | Cummins | Receive Locomotive Equipment 5 | On change, set to requested power for engine/generator and forward to send sensor interface, process power change |
| 9 | APU power | PowerSensor | Receive Locomotive Equipment 6 | On change, calculate reported power and engine 1 RPM sensor values (synthesize) and send to send sensor interface, process power change |
| 10 | APU | APU ID | APU Command Interface | On receipt, process response |

In TABLE 3, Line 1 indicates that engine RPM instructions are present on Receive Engine Interface 1, which refers to the intercepted engine RPM control instruction from the legacy locomotive controller 162. The action(s) that the intercept locomotive controller 162 takes in response to this instruction are: (1) calculate the power request, and (2) allocate power requests to the locomotive consist 110. These actions are described in additional detail elsewhere herein.

Line 2 of TABLE 3 indicates that generator excitement instructions will be present on Receive Engine Interface 2. These generator excitement instructions are the intercepted generator excitement voltage from the legacy locomotive controller 114. The action(s) that the intercept locomotive controller 162 takes in response to these instructions are: (1) calculate the power request, and (2) allocate power requests to the locomotive consist 110. These actions are described in additional detail elsewhere herein.

In an exemplary embodiment, the above-referenced RPM instructions and generator excitement instructions are received in the Cummins6500 format, however, one skilled in the art will recognize that the instructions may be received in alternative formats.

Line 3 of TABLE 3 indicates an exemplary connection by the intercept locomotive controller 162 to pre-existing fault circuitry within the locomotive 112 using the Receive Locomotive Equipment 0 interface. In this exemplary connection, the fault sensor is tied to the MU interface fault line and uses the MU signaling standard, however, embodiments of the invention are equally applicable to alternative signaling standards. The intercept locomotive controller 162 is configured to periodically poll the interface, register a change in voltage on this interface as a fault, process that fault, and forward the fault indication to other locomotive systems on send sensor interface 170.

Line 4 of TABLE 3 indicates an exemplary intercept by the intercept locomotive controller 162 of a traction motor temperature sensor on the Receive Locomotive equipment 1 interface. The traction motor temperature sensor is configured as reporting using a known temperature sensor reporting mechanism (shown as the control-reporting model "TempSensor"). The intercept locomotive controller 162 is configured to poll this interface periodically, and report changes by echoing them to the legacy locomotive controller 162 on a send sensor interface 170.

Line 5 of TABLE 3 indicates an exemplary intercept by the intercept locomotive controller 162 of a traction motor power draw sensor on a Receive Locomotive Equipment 2 interface. The power draw sensor reports power using a known power reporting mechanism (shown as the control-reporting model "PowerSensor"). The intercept locomotive controller 162 is configured to detect a change in the reported value, recalculate the amount of reported power in accordance with the amount of power the legacy locomotive controller 114 is expecting to see on the bus 124, and send the calculated amount of reported power encoded using the "PowerSensor" scheme to the legacy locomotive controller 114 on a send sensor interface 170.

Note that in this exemplary embodiment the intercept locomotive controller 162 is passively managing the traction motor draw and temperature in order to cause the legacy locomotive controller 114 to properly manage cooling of the traction motor 128. In other embodiments, the intercept locomotive controller 162 may be configured to receive a traction motor temperature and/or a traction motor power draw value, calculate the amount of cooling required, and directly control the traction motor 128 and/or traction motor blower 204. This illustrates the flexibility of the intercept approach to managing a legacy locomotive.

Line 6 of TABLE 3 indicates an exemplary intercept of the DC bus power sensor 140 by the intercept locomotive controller 162 on the Receive Locomotive Equipment 3 interface. The DC bus power sensor 140 reports power using a known power reporting mechanism, referred to herein as the control-reporting model "PowerSensor". The intercept locomotive controller 162 is configured to detect a change in the reported value, recalculate the amount of power available to the locomotive 112 using previous power requests from the legacy locomotive controller 114, and transmit the recalculated sensor value to the legacy locomotive controller 114 on send sensor interface 170. Note that the amount of power reported to the legacy locomotive controller 114 may be replaced, scaled, or similarly adjusted to provide "expected" values of DC bus power to the legacy locomotive controller 114.

Line 7 of TABLE 3 indicates an exemplary intercept of the first engine RPM sensor by the intercept locomotive controller 162 on a Receive Locomotive Equipment 4 interface. As one non-limiting example, the signals from the first engine RPM sensor may be encoded using a known Engine RPM encoding scheme, such as, for example, a Cummins encoding scheme. The intercept locomotive controller 162 is configured to receive a changed value on this Receive Locomotive Equipment 4 interface, adjust the reported value to report the expected engine RPMs in accordance with a previously requested engine RPMs and the amount of power received from other sources (e.g., APUs 50), and to forward the calculated RPMs value to the legacy locomotive controller 114 using a send sensor interface 170. The intercept locomotive controller 162 then processes a change in power provided by the engine/generator set 116 as described herein.

Line 8 of TABLE 3 indicates an exemplary intercept of the first generator excitement sensor by the intercept locomotive controller 162 on a Receive Locomotive Equipment 5 interface. As one non-limiting example, the signals from the first generator excitement sensor may be encoded using a known generator excitement voltage scheme, such as, for example, a Cummins encoding scheme. The intercept locomotive controller 162 is configured to receive a changed value on this Receive Locomotive Equipment 5 interface, adjust the value received to a value expected based upon the requested power/excitement of the generator, and forward this synthesized value to the legacy locomotive controller 114 on a send sensor interface 170. The intercept locomotive controller 162 then processes a change in power provided by the engine/generator set 116 as described herein.

Line 9 of TABLE 3 indicates an exemplary intercept of an optional APU power sensor by the intercept locomotive controller 162 on a Receive Locomotive Equipment 6 interface. The APU power sensor reports power using a known power reporting mechanism, referred to herein as the control-reporting model "PowerSensor". The intercept locomotive controller 162 is configured to detect a change in the reported value, recalculate the amount of power available to the locomotive 112 using previous power requests from the legacy locomotive controller 114, synthesize sensor values for other power source sensors, and to forward these synthesized sensor value to the legacy locomotive controller 114 on a send sensor interface 170. The intercept locomotive controller 162 then processes a change in power provided to the locomotive 112 as described herein.

Line 10 of TABLE 3 refers to signals transmitted over the interface between the intercept locomotive controller 162 and an APU 50 using an APU Identification interface standard through which the intercept locomotive controller 162 receives identifying information and operational information from the APU 50. Upon receipt of a notification or status report from the APU 50, the intercept locomotive controller 162 responds by processing the notification/status report as described herein. Depending upon the report, it may synthesize one or more sensor readings and output them to one or more send sensor interfaces 170 configured for the intercept locomotive controller 162.

According to various embodiments of the invention, an intercept locomotive controller, such as intercept locomotive controller 162, may be implemented within legacy locomotive systems in a number of ways. In one embodiment, an intercept locomotive controller is interfaced with a pre-existing (legacy) digital locomotive controller. The digital locomotive controller receives digital signal inputs and produces digital signal and control outputs that are translated into engine, generator, and other component actions when they are received by the controlled component. The intercept locomotive controller intercepts sensor signals and control outputs from the digital locomotive controller by receiving a digital signal transmitted to the digital locomotive controller, decoding that signal, creating replacement encoded digital signals to be transmitted to the digital locomotive controller. In an alternative embodiment, an intercept locomotive controller is interfaced with a pre-existing analog electro-mechanical locomotive controller. The pre-existing analog controller receives analog signal inputs characterized as voltages, amperages, and/or waveforms proportional to their sensor readings and produces analog signal and control outputs characterized by voltages, amperages, and/or waveforms proportional to the desired control actions that are translated into engine, generator, and other component actions when they are received by the controlled component. Examples of these waveforms include amplitude modulation, frequency modulation, and hybrid schemes such as pulse-width-modulation (PWM). The intercept locomotive controller intercepts the sensor signals and control outputs by receiving an analog signal, decoding that signal and translating it so it may be acted upon by the intercept locomotive controller, and then creating replacement analog signals reflecting the control intent of the intercept locomotive controller. In yet another alternative embodiment, the intercept locomotive controller is interfaced to a pre-existing (legacy) analog or digital "genset" locomotive controller. Genset controllers differ from a traditional locomotive controller in that they support more than one engine/generator set.

In each of the above-described implementations, the intercept locomotive controller 162 is electrically connected between the control outputs of the legacy locomotive controller 114 and the engine/generator set 116 of the legacy locomotive 112. The intercept locomotive controller 162 receives control signals from the legacy locomotive controller 114, receives inputs from external power sources or APUs 50, and inputs from sensors attached to the traction bus 124 and/or traction motors 128. Optionally, the intercept locomotive controller 162 may also be interconnected so as to receive other inputs, such as inputs from generator-based sensors 122. The intercept locomotive controller 162 uses these inputs to determine the desired control adjustments, determines the attributes of modified control and sensor signals, and then transmits modified control signals to the engine/generator set 116 in order to configure the amount of power generated by the legacy locomotive engine/generator set 116.

Optionally, the intercept locomotive controller 162 also transmits control signals to an APU 50 (and APU controller 70) via control cables 100 in order to set or control the amount of power generated by the APU 50. Intercept locomotive controller 162 is also programmed to generate a traction motor command that is configured to maintain desired or requested levels of tractive power to the traction motors 128 consistent with the (implied intent) of the original control signal from the legacy locomotive controller 114. The intercept locomotive controller 162 may also modify or generate other signals that are passed to the legacy locomotive controller 114 in order cause the legacy locomotive controller 114 to behave as if it were connected directly to the engine/generator set 116 without the intercept locomotive controller 162 or the external power provided by the APU 50. The power produced by APU 50 is then transmitted to locomotive traction bus 124 via power cables 142.

In the case of a fault of a locomotive engine/generator 118, 120, the fault may be reported by the intercept locomotive controller 162 to the user interface 136, and/or the legacy locomotive controller 114. In some implementations, the fault is reported only to the user interface 136, and the power allocation function of the intercept locomotive controller 162 requests additional power from other engines 118 and/or APUs 50 to make up for the loss of power from the fault. In this case, the intercept locomotive controller 162 will report that the engine 118 in running normally (RPM, power produced, power on the bus) when it has actually failed. If additional power is obtained from other locomotive equipment engines 118 (for example, by raising their engine RPMs), their sensor values are similarly adjusted to report that they are operating as previously instructed.

According to one embodiment, at least one of APU controller 70 and at least one of legacy locomotive controller 114 and intercept locomotive controller 162 are configured to detect a fault in the transmission of power and/or control commands through control cables 100. In some embodiments, upon detection of the fault, intercept locomotive controller 162 may forward the fault indication to legacy locomotive controller 114. The intercept locomotive controller 162 may be configured take one or more actions in response to the fault condition. If the fault condition is in the control cable connection 100 between a locomotive controller (either 114, 162, or both) and APU 50, example actions may include: resend one or more the power and/or control commands to APU 50, send a status command to APU 50, read one or more sensors and make a determination of the seriousness of the fault condition, alert the locomotive operator thru a display or alerting device (e.g., light, alarm signal), forward the fault to another locomotive controller. Other actions may be programmed into the intercept locomotive controller 162 in response to communications faults between intercept locomotive controller 162 and APU 50 as would be understood by those skilled in the art. Alternatively, or in addition thereto, intercept locomotive controller 162 may be programmed to modify a previously sent power command upon detection of the fault, or to set APU 50 to an "unavailable" status and reallocate power requirements allocated to APU 50 to other engine/generator sets within the locomotive consist 110. For example, if APU 50 is showing a connection fault on its command circuit and it is not providing power to the power bus 124 as indicated by power bus sensors 140, intercept locomotive controller 162 may decide that APU 50 is no longer functioning and reallocate the power requirements allocated to APU 50 to a primary locomotive engine/generator set 116, causing it to increase its RPMs and alternator excitement voltages in order to provide the missing power to the power bus 124.

In some implementations, the intercept locomotive controller 162 may report an APU 50 as an additional (phantom) primary engine/generator combination, and interpret legacy controller power control information to that "phantom" engine/generator as instructions to the APU 50. In these cases, the intercept locomotive controller 162 serves as a protocol converter that converts engine/generator control information to/from the command protocol of the APU 50. In addition, the intercept locomotive controller 162 may handle APU disconnects (or simply an unconnected APU) by reporting that the engine has been derated, has failed, or that it has failed to respond to the control inputs.

In some instances, intercept locomotive controller 162 is expecting a response from APU controller 70 that is not received, or is receiving in an unusable form. In this case, intercept locomotive controller 162 may take one or more actions to respond to the missing response. For example, these actions may include any or all of the following: resend one or more the power and/or control commands to APU 50; send a status command to APU 50; read one or more sensors and make a determination of the seriousness of the fault condition; alert the locomotive operator using a display or alerting device (e.g., light, alarm signal), generate a fault to another locomotive controller, generate a fault on one or more interfaces (such as the MU interface). Other actions may be programmed into intercept locomotive controller 162 in response to communications faults between intercept locomotive controller 162 and APU 50 as would be understood by those skilled in the art.

In other instances, intercept locomotive controller 162 may receive notifications from APU controller 70 asynchronously. These notifications may comprise event or alert notifications, or may simply comprise information provided by APU controller 70 that intercept locomotive controller 162 may consider in managing locomotive consist 110. The actions taken by intercept locomotive controller 162 in response to these notifications may include any or all of the following: do nothing, send a command to APU controller 70 requesting additional information about APU controller memories 98; process the received information as a fault indication or as a connection notification; process the received information as a sensor reading related to APU operation; store the received information in intercept locomotive controller memory 146 for use during power cost calculations; store the received information in locomotive controller memory 146 for use in subsequent power allocation calculations; recalculate the cost of power provided by APU 50 for use in power allocation decisions; reallocate power allocation to APU 50; and command APU 50 to provide a differing amount of power to locomotive power bus 124. Other actions may be programmed into intercept locomotive controller 162 in response to notifications received by intercept locomotive controller 162 from APU 50 as would be understood by those skilled in the art.

Intercept locomotive controller 162 may recognize that something is connected to its control line based upon the presence or absence of voltage, current or capacitance on the line. Upon recognizing the connection of a new device to the locomotive control line (and the connection of the power and control circuits or cables), intercept locomotive controller 162 undertakes the following steps to determine information about APU 50: A) communicate with the device to determine if indicated connection was to an APU, a fuel assembly, or some other device, and if the device is not an APU or fuel assembly, intercept locomotive controller 162 takes an action consistent with a fault handling (as described above); B) intercept locomotive controller 162 sends a command to the device to determine device identifying information and receives a response, and if a response is not received, it is handled as described above; C) intercept locomotive controller 162 optionally sends additional commands to the device and receives additional responses from the device to determine additional information about the device, or looks up information about the device, either in a local memory or from a remote computer, to determine the additional information, D) intercept locomotive controller 162 stores the information received in memory 146 for subsequent use; and E) based upon the type of device connected, intercept locomotive controller 162 takes additional actions selected from the set of actions: perform power cost calculations, perform power allocation, send a power command to APU 50, and select a fuel assembly.

Intercept locomotive controller 162 performs power cost calculations as the cost of providing power changes. In an embodiment, the power cost calculation is a scalar value provided by an external device, a calculation based upon the cost of fuel and a conversion factor indicative of the power source's efficiency of converting a unit of fuel into power (e.g., kilowatts per gallon). The calculations can also utilize the energy content of fuel provided. In some embodiments, the calculations produce a scalar value. In others, the calculations produce an n-dimensional based upon one or more engine performance metrics (e.g., amount of power produced, engine RPM, generator excitement voltages, one or more metrics related to the fuel being used (price of fuel, energy content of fuel), and one or more metrics related to operating conditions (e.g., temperature, air pressure). The results of these calculations are stored in intercept locomotive controller memory 146 for further use.

Intercept locomotive controller 162 sends a power command to APU controller 70 instructing it to provide a specific amount of power to the power bus 124. Optionally, this power command may include an indication that the power command should be performed quickly, such as when intercept locomotive controller 162 is processing wheel slip or faults. The power command send to APU controller 70 typically differs from normal engine control voltages in that it specifies an amount of power (current and voltage) to provide because intercept locomotive controller 162 is generally unaware of the power source settings associated with providing a desired amount of tractive power. Because intercept locomotive controller 162 is unaware of these settings, intercept locomotive controller 162 can interoperate with APUs 50 using differing power sources. This provides a significant operational advantage.

After intercept locomotive controller 162 sends a power command to APU controller 70, APU controller 70 responds to intercept locomotive controller 162 in several ways. First, APU controller 70 responds to the power command with a response on the control cable connection 100 to the requesting intercept locomotive controller 162. If intercept locomotive controller 162 does not receive the response within a configuration determined timeframe, intercept locomotive controller 162 takes corrective action as described above for missed response. Secondly, intercept locomotive controller 162 monitors sensors 140 on power bus 124 to determine if APU 50 as provided the requested power. If the power requested does not appear on power bus 124 within a configuration determined, or dynamically determined timeframe, intercept locomotive controller 162 handles this failure to respond as a fault (as described above).

One aspect of intercept locomotive controller 162 is to manage locomotive consist 110 with respect to overall emissions produced. APUs 50 may provide to intercept locomotive controller 162 information (graphs or scalar metrics) that represent the emissions produced or with respect to emissions produced by each engine. In order to obtain emissions levels which adhere within certain limits or which better match certain target objectives, intercept locomotive controller 162 may determine that APU 50 should operate using a certain balance of one fuel in preference to another (e.g., natural gas as opposed to syngas), or to use a certain mix of the two fuels over a particular time scale. For instance, a locomotive consist may not be able to achieve desired management of both NOx and particulate matter emissions over a certain distance or time by running natural gas 100% of the time. Intercept locomotive controller 162 makes this determination based upon higher level calculations based in part upon the emissions profile of the power sources available to intercept locomotive controller 162, their emissions profile under particular load conditions, fuels available, and the location of locomotive consist 110 and its projected load conditions. Intercept locomotive controller 162, when making these calculations, adds the steps of sending a request to one more of the APU 50, fuel assemblies 52 to determine the fuel types and emissions profiles for power requests to APU 50. Intercept locomotive controller 162 receives the requested information, stores it in memory 146, and then uses processor 116 to calculate the emissions profiles. Once the emissions profiles are calculated, intercept locomotive controller 162 makes a determination regarding fuels to use and power allocations, and instructs APU 50 and/or fuel assemblies 52 appropriately.

In some implementations, the intercept locomotive controller 162 is programmed with the legacy locomotive controller type, sensor types and interface connections (and expected ranges), engine/generator types/control parameters and interface connections, and similar information. This information may be programmed in when the intercept locomotive controller 162 is installed, or it may be preprogrammed into the controller itself. Optionally, the intercept locomotive controller 162 may interrogate attached devices to determine the information required. In some implementations, the intercept locomotive controller 162 may observe the control signals and/or presented by portions of the locomotive control system 113 and determine the appropriate settings by looking up observed information in an internal database of observed settings. The auxiliary power enabled locomotive control system 113, including a legacy locomotive controller 114 and an intercept locomotive controller 162, is able to make power allocations between power sources. The auxiliary power enabled intercept locomotive controller 162 specifically is able to determine if an APU 50 is connected, and if so, use APU 50 as one of the available power sources by integrating the operations of the APU 50 into the locomotive operations by intercepting control information and sensor inputs and creating synthesized control information.

Intercept locomotive controller 162 is coupled to a memory module 146 within which is stored its current cost of producing power using the standard power. The current costs of producing power may be a unique number, or may be a sequence of numbers stored in a look-up table based upon engine RPM. In one embodiment, memory module 146 also stores a price of fuel for locomotive engines 78. This price can be manually or electronically updated on a periodic basis. Intercept locomotive controller 162, using this table, and the known engine RPMS, can compute the cost of providing a unit of power to the locomotive's traction and/or auxiliary power busses 124, 126. This cost is called the internal generation cost.

Knowing the current cost of power, intercept locomotive controller 162 may then seek lower cost power from APU 50 when APU 50 is able to provide power for the locomotive busses 124, 126 at costs below the internal generation cost. Intercept locomotive controller 162 reads the current power cost from APU controller 70, and compares the internal generation cost to the price provided by APU controller 70, and selects engine control points (and engine/generator settings) and APU power settings to obtain power from at least one of the lowest cost source and a combination of sources whose costs aggregate to the lowest total cost. In some cases, this means intercept locomotive controller 162 will power down the engine/generator sets 116 and use only power produced by APU 50. In other cases, intercept locomotive controller 162 will use power generated by both APU 50 and engine/generator sets 116. In still other cases, intercept locomotive controller 162 will idle APU 50 and use only onboard power produced by engine-generator sets 116.

In one embodiment, the power command transmitted by intercept locomotive controller 162 will specify a desired amount of power. In other embodiments, the power command transmitted by intercept locomotive controller 162 may specify a desired operating point on a performance graph of APU 50 or a desired power level of the output power of APU 50.

In an optimization to this algorithm, railroads may purchase bulk power from power providers using APU 50 as described above. Their power purchases may be stored within and reported by a meter (not shown) provided within in APU 50. Intercept locomotive controller 162 may interrogate the meter and determine the amount of power remaining in the current bulk purchase, and make its power allocation decisions based at least in part upon the amount of power previously purchased. This is especially advantageous when the bulk purchases are "use or lose", and it is advantageous to the locomotive operator to use all of their previously purchased power. Depending upon the embodiment, the optimization algorithm can also include the aspect that with APU 50 operating, the overall power available to the traction bus 124 can be higher than with the locomotive(s) alone, and there may be portions of the route where the higher power has value to the railroad and therefore it is beneficial for the system to reserve sufficient fuel for those portions of the route. As such, the algorithm is looking at several time periods to optimize the value of APU operation, not simply as the minimum cost of power now.

Once operational conditions are processed, intercept locomotive controller 162 checks for messages from APUs 50 or fuel assemblies 52 that have not been processed. These messages are processed, and stored information (e.g., ID information, operational information, etc.) about the power sources and/or fuel assemblies are updated periodically. These messages may indicate a change in a removably connected power source 50 and/or fuel assembly 52, fuel state or type, the amount of power provided by an auxiliary power source, a cost of power provided, an updated graph, or other change that intercept locomotive controller 162 takes into account when optimizing the performance of locomotive consist 110.

If power, fuel, or cost information is updated, intercept locomotive controller 162 then conducts a series of interactions with the power sources and fuel assemblies to update its stored information to current values. Intercept locomotive controller 162 then recalculates any information it has stored based upon the updated stored values.

After completing the update of the stored information, intercept locomotive controller 162 determines information that will be used to support the power allocation process. This information includes the real-time amount of power desired by the locomotive (based upon throttle notch settings, auxiliary loads, traction motor requirements, etc.), and determines the current amount of power available by totaling the amount of power each power source may provide. It further determines the power cost for each power source, either as a scalar metric or as an efficiency graph that describes the power costs relative to the amount of power provided, or as a metric or efficiency graph based upon the fuel type/composition. In some cases, fuel cost, operational metrics such as temperature or air pressure, and other metrics are used as inputs in determining the power cost. Other parameters such as power sources requested to produce a minimum amount of power are also collected. In an embodiment, this information may include emissions and or maintenance schedule information about each of the power sources.

Intercept locomotive controller 162 then checks to determine if the power provided to locomotive 112 is within a configuration specified tolerance of the power requested to operate the locomotive 112. If the power requested and power provided are out of tolerance, or one of the power cost parameters changed, intercept locomotive controller 162 makes a power allocation between the power sources, dividing the locomotive power requirement between available power sources, such as, for example, locomotive engine-generator sets 116 and auxiliary power sources such as APU 50. In one embodiment, the power allocation is performed in a way to minimize the total cost of power utilized by the locomotive 112, using the power cost and minimum/maximum amounts of power produced for each power source as input. In some embodiments, the power cost is a graph that represents the varying power cost based upon the amount of power provided. Intercept locomotive controller 162 finds the minimum total cost based upon the amount of power requested, and sets the primary power sources (e.g., sets excitement and RPMs of generator 120) and sends requests to APUs 50 to provide the desired amount of power.

Power allocation algorithms may be very complex, and may include current location, anticipated power requirements, and other factors in the allocation algorithm. In some embodiments, the power allocation may be simplified to use fuel costs as the allocation factor. For example, when the difference between diesel and natural gas fuel prices exceed a certain level, the lower priced fuel is always less expensive to operate. Similarly, if specific fuels are available, it may more efficient to operate with those fuels. The results of the power allocation process are stored in intercept locomotive controller memory 146 for subsequent use.

Intercept locomotive controller 162, having configured locomotive consist 110 to operate with a specific source and amounts of power then monitors the power provided by each power source to determine if the amount of power being provided is in accordance with the settings, and makes adjustments to the power source configurations as needed to keep the amount of power provided to the locomotive in line with the power requirements. The control loop then repeats on a periodic interval.

In applications where fuel assemblies 52 have direct control and fuel connections 148, 150 with locomotive 112, valves (not shown) fluidly connect pressure tanks 60 to locomotive engines 118. Intercept locomotive controller 162 may interrogate each fuel assembly 52, determine the type of fuel, its cost, and its energy density, and determine which of the available fuels it should use in the current situation based on the information received from fuel assemblies 52. After selecting the fuel to use, intercept locomotive controller 162 can configure the engine operating parameters (idle, timing, etc.) so engines 78 process the selected fuel most efficiently. For example, it may be cost effective to use syngas or process gas while engines 78 are idling, and to use LPG when the engines 78 are running at maximum RPM. Similarly, intercept locomotive controller 162 can use fuel cost and/or fuel energy density as inputs in determining which fuel should be used in the current situation.

In an embodiment that blends power from an APU 50 and the locomotive engine 118, the amount of power delivered to the traction motors 128 is the sum of the APU power and the locomotive diesel power. In some instances, the APU sourced power will comprise the large majority of power delivered to the traction motors 128. The challenge is to provide sufficient traction motor cooling air when the locomotive 112 is now generally putting out considerably less tractive bus electrical power. For example, while the locomotive engine 118 is no longer operated at high RPM for the purpose of producing tractive power, lowering the RPM of engine 118 may reduce the amount cooling air provide to the traction motors to a level below that appropriate for the level of power flowing on the traction bus 124. As previously described, each of the extant drive methods depends either directly (mechanical drive, first electric drive method) or indirectly (second electric drive method in its available power limitations) on the diesel RPM to provide adequate cooling airflow from traction motor blowers 204 to the traction motors 128. An example operating plan for intercept locomotive controller 162 that maintains the RPM of engine-generator set 116 is detailed above in TABLE 1.

Described herein are various approaches to providing adequate traction motor cooling when a legacy locomotive 112 is operating with an APU 50. In a fast idle embodiment (exemplified above by operating plan in TABLE 2), the existing traction motor blowers 204 are used and the intercept locomotive controller 162 transmits a blower motor command that permits locomotive diesel engine 118 to run at the specific RPM associated with each notch, but can run with a lower load and therefore lower fuel consumption and emissions. Note the load on the diesel engine 118 can be modulated by controlling the excitation of the main and/or companion alternator 120 of the locomotive 112.

The traction motor blowers 204 may be controlled using an electric drive from the existing locomotive power train, a mechanical drive from existing locomotive power train (i.e., power take off from the diesel engine 118), or a hydraulic drive of the traction motor blowers 204, effected by power take off from the diesel engine 118 to drive a hydraulic pump, connected hydraulically to hydraulic motor driving traction motor blower 204, with appropriate valves, accumulators, and pressure regulators in hydraulic lines.

In electric drive embodiments, control of the traction motor blowers 204 may be effected via AC directly from the main generator, AC directly from an companion alternator, AC directly from an auxiliary generator, or a combination thereof with added VFD. Alternatively, control may be effected by inverting DC power from the power bus 124 to drive traction motor blowers 204, or driving AC or DC traction motor blowers 204 using electric energy stored in batteries on the locomotive 112 or a tender.

In mechanical drive embodiments where the legacy locomotive 112 includes a mechanical drive for the traction motor blowers 204, the mechanical drive may be left as is, or a gearbox or transmission may be incorporated to provide either a fixed ratio speed increase or variable speed for operation of traction motor blowers 204. Alternatively or in addition thereto, a clutch may be included in the mechanical drive train of fraction motor blowers 204 to permit complete/rapid periodic/partial depowering of traction motor blowers 204 when, for example, "fixed" engagement of power train would provide for an excess of blower air according to the momentary cooling appropriate for the traction motors 128.

In alternative embodiments, the existing traction motor blowers 204 may be used at a slow diesel RPM/no fast idle condition. In such embodiments, the locomotive diesel RPM and power output is controlled to produce enough power, when summed with the power produced by one or more power sources on one or more auxiliary power unit assemblies 48, to be adequate to supply the amount of power associated with the specific notch requested by the train crew, including service of locomotive hotel loads including traction motor blowers. In such embodiments, traction motor blowers 204 may be controlled using an electric drive from the existing locomotive power train, a mechanical drive from existing locomotive power train (i.e., power take off from diesel), or a hydraulic drive of the traction motor blowers, in a similar manner as described above.

In yet another embodiment, a new source of power may be provided for traction motor blowers 204 such as, for example, an engine smaller than the primary engine 118, a fuel cell, or a battery bank. Alternatively, the new source of power may include, for example, a new "auxiliary" prime mover, an electric drive if new auxiliary is a genset or fuel cell, including all AC or DC variants of driving traction motor blowers, a mechanical drive from new auxiliary prime mover shaft power, a battery bank, and transfer of AC or DC power from an APU 50 not on the locomotive chassis. The sole or shared purpose of this new power source would be to power traction motor blowers 204.

New traction motor blowers may also be provided. Such traction motor blowers may either supplement existing fraction motor blowers and pneumatically connect in parallel or series with extant traction motor blowers, or replace existing traction motor blowers with new ones sized to yield adequate airflow at low locomotive diesel RPM, either with "excess" airflow at higher RPM or with modulated flow to reduce "excess" airflow at higher RPM.

A refrigeration system may also be included to provide pre-cooled air supply to cool traction motors 128, thus providing adequate cooling under either "fast idle" air flow regimes or "slow/no fast-idle" air flow regimes.

An air storage system may also be provided on locomotive 112 for purpose of accumulating compressed air volumes to be released as supplement to e.g., "slow/no fast idle" traction motor blower air flow. A reservoir for such system could be integral to locomotive chassis or on separate car chassis. The reservoir could be "pre-charged" before train starts trip and/or replenished by compressor mechanism during train operations.

Figure 5:
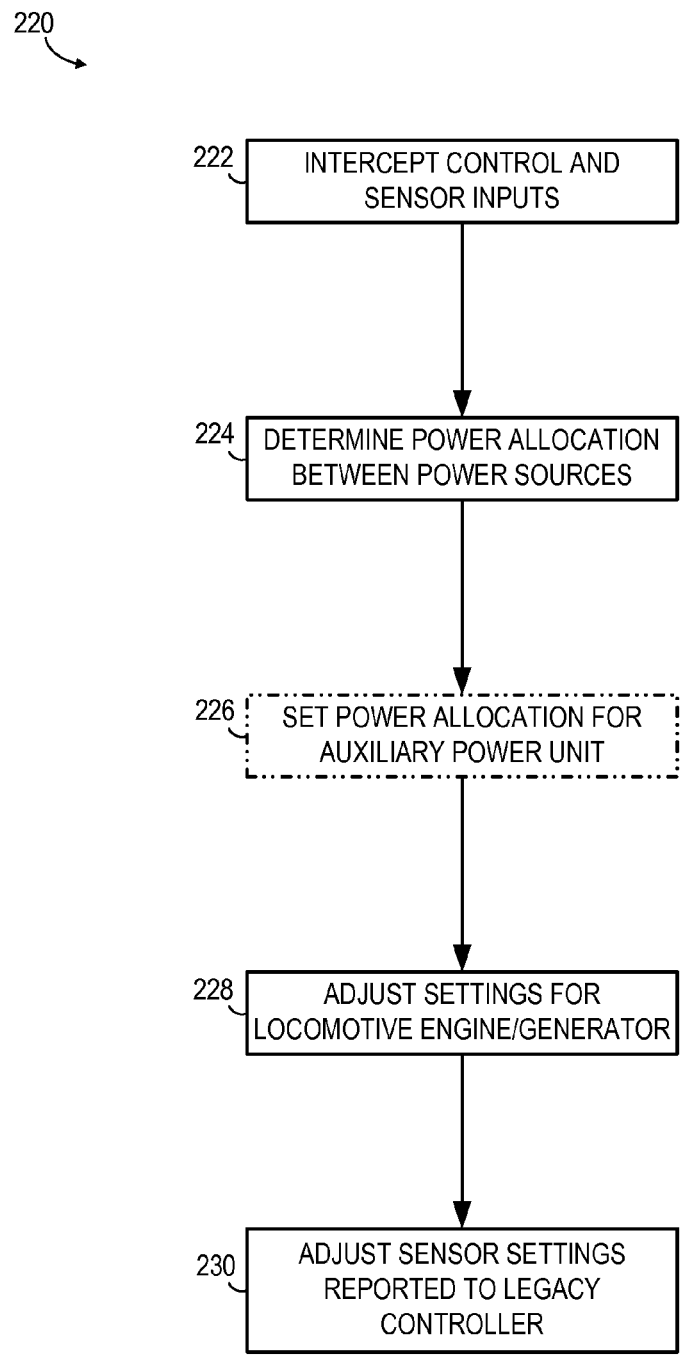
FIG. 5 illustrates an exemplary control process for controlling a locomotive assembly, such as the locomotive assembly of FIG. 2, in accordance with an embodiment of the invention.

FIG. 5 illustrates an exemplary control process 220 implemented by an intercept locomotive controller, such as intercept locomotive controller 162 described with respect to FIGS. 2-4. This control process 220 may be performed asynchronously when a control input changes, or upon a regularly scheduled, or calculated, repeating basis. At step 222, the intercept locomotive controller 162 receives control and sensor inputs from one or more of the legacy locomotive controller 114, engine/generator sensors 122, power sensors 140, and other sensors 200 provided within locomotive 112. The intercept locomotive controller 162 transforms these control and sensor inputs into digital values, which are stored in a memory 164 of the intercept locomotive controller 162.

The intercept locomotive controller 162 then proceeds to step 224 wherein a power allocation between available power sources is determined. Using the digital values stored in the memory 146 of intercept locomotive controller 162 during step 222, the intercept locomotive controller 162 then looks up the resulting power and sensor values in one or more power allocation/sensor value lookup tables and/or other control allocation tables. The power and sensor values are stored in memory 164 for use by subsequent steps.

In optional step 226 (shown in phantom), the intercept locomotive controller 162 uses at least one of the values stored in memory 164 to provide a control output to APU 50 in order to set the amount and/or characteristics of power provided by the APU 50. In some implementations, this step may be omitted because the APU 50 provides consistent power.

In step 228, the intercept locomotive controller 162 then uses at least one of the values stored in memory 164 to provide a control output to the engine/generator set 116 of locomotive 112 in order to set the amount and/or characteristics of power provided by the engine/generator set 116. The process proceeds to step 230, where the intercept locomotive controller 162 then uses at least one of the values stored in memory 164 to provide sensor data to the legacy locomotive controller 162.

One of the aspects of the intercept locomotive controller 162 is that it permits the allocation of required power on the traction bus 124 to one or more locomotive engine/generator sets 116 and/or external power units or APUs 50, without changing the existing legacy locomotive control system and engine/generator configuration. This permits the existing legacy locomotive 112 to operate within its existing emissions certifications.

A second aspect of the intercept locomotive controller 162 is that it permits the allocation of requested locomotive power based upon the availability of lower cost power. In a simple implementation, the allocation may be predetermined and encoded within the memory 164 of the intercept locomotive controller 162. For example, if the external power unit or APU 50 has a cost per unit power that is significantly below the cost of running the legacy locomotive engine/generator set 116, the intercept locomotive controller 162 may make a power allocation decision to allocate a majority of the power demand to the APU(s) 50. This allocation may range from 50% to 100%, depending upon the relative cost of power and restrictions to keep the legacy locomotive engine/generator set 116 operating in order to provide auxiliary power or for regulatory reasons. Should regulatory restrictions permit or require a different allocation range, the intercept locomotive controller 162 can be re-configured to allocate power requests accordingly.

A third aspect of the intercept locomotive controller 162 is that it permits operation with external, auxiliary power units over which there is no effective control. When this situation occurs, the intercept locomotive controller 162 has received inputs from the legacy locomotive controller 114 and from a sensor monitoring the power available on the traction bus 124 or of the draw of one or more traction motors 128. Based upon the amount of power available and/or the power used and the encoded locomotive power setting command inputs from the legacy locomotive controller 114, the intercept locomotive controller 162 determines at least one control setting for the legacy locomotive engine/generator 118, 120 and creates a control signal effective to control the production of tractive power by the legacy locomotive engine/generator set 116.

A fourth aspect of the intercept locomotive controller 162 is that it permits legacy locomotives to operate in conjunction with alternative fuel-based power, such as gaseous fuels, without modifying the existing legacy locomotive controller. Use of such fuels can require additional modifications to a legacy locomotive or the use of APUs 50 capable of using such fuels. Embodiments of the described systems and methods also support the concept of power arbitrage between differently fueled locomotive power sources, where the arbitrage is made based upon cost of fuel or the cost of delivered power vs. the power requests of locomotive traction and auxiliary loads.

A fifth aspect of the intercept locomotive controller 162 is that it supports the use of auxiliary power unit assembly arrangements in order to permit the provision of additional power to a locomotive over the amount of power that can be produced by the engine/generator combination(s) that are part of the diesel locomotive. In some operational situations, such as when the locomotive consist is running at higher speeds, the pulling capacity of the locomotive is limited by the amount of power that can be provided by the locomotives to their traction motors. The use of auxiliary power permits the locomotive to move the train to greater speeds.

Still further, embodiments of the described systems and methods enable a metering-based power delivery approach, where the locomotive power use from alternative fuel power sources is metered and may be separately invoiced or billed to the railroad or locomotive operator. While the systems and methods of use set forth herein are described as being used in connection with the locomotive industry, one skilled in the art will recognize that the benefits of the fuel assembly, rail car assembly, and method for providing fuel are equally applicable to any number of alternative industrial applications in which a fuel tank is coupled to an engine, such as, for example, in the trucking industry or the maritime industry.

One key aspect when using alternative fuel types in an auxiliary power unit assembly is the differential in fuel cost, or ultimately, the cost of a unit of power provided to a power bus. Embodiments of the intercept locomotive controller 162 set forth herein are able to arbitrage fuel and power costs between the locomotive's power sources and auxiliary power unit assemblies provided in a power tender to more efficiently operate. Further, the intercept locomotive controllers and auxiliary power unit assemblies set forth herein are able to communicate additional information (such as its ID, control input description, control settings/emissions, control setting/generated power graphs, fuel type, power cost) about the control and operation of the auxiliary power unit to the intercept locomotive controller 162. Absent at least some of this information, the intercept locomotive controller 162 would be unable to effectively control the auxiliary power units.

Various features and aspects of the above described system may be used individually or jointly. Further, although embodiments of the intercept locomotive controller have been described in the context of its implementation in a particular environment, and for particular applications (e.g., railroad usage), those skilled in the art will recognize that its usefulness is not limited thereto and that the system can be beneficially utilized in any number of environments and implementations where it is desirable to retrofit existing power generator controllers in order to use external power units or to arbitrage power costs from alternative fuel generation sources.

More generally, from the foregoing, it will be appreciated that specific embodiments of the technology have been described herein for purposes of illustration, but that various modifications may be made without deviating from the technology. Certain aspects of the technology described in the context of particular embodiments may be combined or eliminated in other embodiments. Further, while advantages associated with certain embodiments of the technology have been described in the context of those embodiments, other embodiments may also exhibit such advantages, and not all embodiments need necessarily exhibit such advantages to fall within the scope of the present technology. Accordingly, the disclosure and associated technology can encompass other embodiments not expressly shown or described herein.

A technical contribution for the disclosed method and apparatus is that it provides for a computer implemented control of an intercept locomotive controller that is electrically coupled between a locomotive controller and a primary power unit of the locomotive and that is programmed to intercept an initial locomotive control signal transmitted from the legacy locomotive controller to the primary power unit indicating an amount of locomotive power, modify the initial locomotive control signal, and transmit the modified control signal to the primary power unit.

One skilled in the art will appreciate that embodiments of the invention may be interfaced to and controlled by a computer readable storage medium having stored thereon a computer program. The computer readable storage medium includes a plurality of components such as one or more of electronic components, hardware components, and/or computer software components. These components may include one or more computer readable storage media that generally stores instructions such as software, firmware and/or assembly language for performing one or more portions of one or more implementations or embodiments of a sequence. These computer readable storage media are generally non-transitory and/or tangible. Examples of such a computer readable storage medium include a recordable data storage medium of a computer and/or storage device. The computer readable storage media may employ, for example, one or more of a magnetic, electrical, optical, biological, and/or atomic data storage medium. Further, such media may take the form of, for example, floppy disks, magnetic tapes, CD-ROMs, DVD-ROMs, hard disk drives, and/or electronic memory. Other forms of non-transitory and/or tangible computer readable storage media not list may be employed with embodiments of the invention.

A number of such components can be combined or divided in an implementation of a system. Further, such components may include a set and/or series of computer instructions written in or implemented with any of a number of programming languages, as will be appreciated by those skilled in the art. In addition, other forms of computer readable media such as a carrier wave may be employed to embody a computer data signal representing a sequence of instructions that when executed by one or more computers causes the one or more computers to perform one or more portions of one or more implementations or embodiments of a sequence.

Therefore, according to one embodiment of the invention, a locomotive assembly includes a power bus, a locomotive, and an intercept locomotive controller. The locomotive includes a primary power unit coupled to the power bus and a legacy locomotive controller programmed to transmit a control command to the primary power unit. The intercept locomotive controller is electrically coupled between the locomotive controller and the primary power unit and is programmed to intercept an initial locomotive control signal transmitted from the legacy locomotive controller to the primary power unit indicating an amount of locomotive power, modify the initial locomotive control signal, and transmit the modified control signal to the primary power unit.

According to another embodiment of the invention, a method of controlling a locomotive includes relaying an initial locomotive control signal from a legacy locomotive controller designed to control at least one power source on the locomotive to an intercept locomotive controller, the initial locomotive control signal comprising an encoded request for a locomotive power setting. The method also includes determining a power output corresponding to the locomotive power setting and allocating the power output between the at least one power source on the locomotive and an auxiliary power source. The method further includes transmitting a modified locomotive control signal to the at least one power source on the locomotive based on the power output allocation, the modified locomotive control signal different from the initial locomotive control signal and transmitting an auxiliary command signal to the auxiliary power source based on the power output allocation.

According to yet another embodiment of the invention, a computer readable storage medium having stored thereon a computer program comprising instructions which, when executed by at least one processor, cause the at least one processor to receive an initial locomotive power setting command from a locomotive controller, the initial locomotive power setting command indicating a desired tractive power. The instructions also cause the at least one processor to modify the initial locomotive power setting command and transmit the modified locomotive power setting command to a locomotive power source. The instructions further cause the at least one processor to receive a sensor signal corresponding to the modified locomotive power setting command, modify the sensor signal to match an expected sensor signal for the initial locomotive power setting command, and transmit the expected sensor signal to the locomotive controller.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments.

Accordingly, the invention is not to be seen as limited by the foregoing description. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system for generating locomotive power comprising:
a power bus;
at least one locomotive primary power unit coupled to the power bus;
a legacy locomotive controller comprising:
   a legacy locomotive memory having stored thereon a predefined operating arrangement for the at least one locomotive primary power unit;
   a control output coupled to a control input of the at least one locomotive primary power unit to transmit control commands thereto in accordance with the predefined operating arrangement; and
   a throttle input coupled to a throttle of the locomotive; and
an intercept locomotive controller comprising:
   a control interface assembly coupled between the control output of the legacy locomotive controller and the control input of the at least one locomotive primary power unit; and
   an intercept memory having stored thereon operational information for the legacy locomotive controller and the at least one locomotive primary power unit;
wherein the intercept locomotive controller is programmed to:
   intercept a control command transmitted by the legacy locomotive controller to the at least one locomotive primary power unit via the control interface assembly;
   correlate the control command to an amount of power requested by the legacy locomotive controller using data stored within the intercept memory;
   allocate generation of the amount of power requested by the legacy locomotive controller between the at least one locomotive primary power unit and an auxiliary power unit; and transmit synthesized sensor signals to the legacy locomotive controller reflective of the at least one locomotive primary power unit producing the full amount of power.

2. The system of claim 1 wherein the control interface assembly of the intercept locomotive controller comprises:
   a first interface that receives an engine RPM setting signal and a generator excitement voltage signal from the control output of the legacy locomotive controller; and
   a second interface that transmits a modified engine RPM setting signal and a modified generator excitement voltage signal to the at least one locomotive primary power unit.

3. The system of claim 2 further comprising:
   a first locomotive sensor;
   wherein the legacy locomotive controller further comprises at least one sensor input coupled to the first locomotive sensor; and
   wherein the intercept locomotive controller further comprises a sensor interface assembly coupled between the first locomotive sensor and the at least one sensor input of the legacy locomotive controller.

4. The system of claim 3 wherein the sensor interface assembly of the intercept locomotive comprises:
   a first interface that receives a sensor signal from the first locomotive sensor; and
   a second interface that transmits a modified sensor signal to the at least one sensor input of the legacy locomotive controller.

5. The system of claim 3 wherein the first locomotive sensor comprises a bus power sensor.

6. The system of claim 3 wherein the first locomotive sensor transmits operational information for the at least one locomotive primary power unit.

7. The system of claim 3 wherein the sensor interface assembly further comprises:
   a first sensor interface coupled to the at least one sensor input of the legacy locomotive controller; and
   a second sensor interface coupled to the first locomotive sensor.

8. The system of claim 1 wherein the at least one locomotive primary power unit comprises at least one locomotive engine-generator set.

9. The system of claim 1 wherein the legacy locomotive memory has stored therein a correlation between a throttle setting for the at least one locomotive primary power unit and an amount of electricity generated by the at least one locomotive primary power unit.

10. The system of claim 1 wherein the auxiliary power source is coupled to the power bus; and
    wherein the intercept locomotive controller is further programmed to transmit control commands to an auxiliary controller electrically coupled to the auxiliary power source in accordance with a power allocation.

11. The system of claim 10 wherein the intercept locomotive controller further comprises an auxiliary power source command interface that transmits the command signals to the auxiliary power unit.

12. The system of claim 1 wherein the intercept locomotive controller allocates power generation based on available power from the auxiliary power unit.

13. The system of claim 12 wherein the intercept locomotive controller allocates a maximum amount of available power generation from the auxiliary power unit.

14. The system of claim 1 wherein the intercept locomotive controller allocates generation of all of the requested amount of power from the auxiliary power unit.

15. A retrofit kit for a locomotive comprising:
    an auxiliary power unit; and
    an intercept locomotive controller comprising:
       a control interface assembly; and
       an intercept memory having stored thereon operational information for a legacy locomotive controller and at least one locomotive primary power unit; and
    wherein the intercept locomotive controller is programmed to:
       intercept a control command transmitted by a control output of a legacy locomotive controller to a control input of the at least one locomotive primary power unit via the control interface assembly;
       correlate the control command to an amount of power requested by the legacy locomotive controller using data stored within the intercept memory;
       allocate generation of the amount of power requested by the legacy locomotive controller between the at least one locomotive primary power unit and the auxiliary power unit; and
       transmit synthesized sensor signals to the legacy locomotive controller reflective of the at least one locomotive primary power unit producing the full amount of power.

16. The retrofit kit of claim 15 wherein the control interface assembly of the intercept locomotive controller comprises:
    a first interface configured to receive an engine RPM setting signal and a generator excitement voltage signal from the control output of the legacy locomotive controller; and
    a second interface configured to transmit a modified engine RPM setting signal and a modified generator excitement voltage signal to the at least one locomotive primary power unit.

17. The retrofit kit of claim 15 wherein the intercept locomotive controller is programmed to prioritize power generation from the auxiliary power unit over the at least one locomotive primary power unit responsive to the control command.

18. The retrofit kit of claim 15 wherein the intercept locomotive controller is programmed to transmit a control command to an auxiliary controller of the auxiliary power unit in accordance with the allocation of the amount of power, the control command specifying an amount of power for the auxiliary power unit to produce.

19. The retrofit kit of claim 15 wherein the intercept locomotive controller is programmed to allocate generation of all of the amount of power requested by the legacy locomotive controller to the auxiliary power unit.

* * * * *

UNITED STATES PATENT AND TRADEMARK OFFICE
CERTIFICATE OF CORRECTION

PATENT NO. : 9,630,633 B2  
APPLICATION NO. : 14/682212  
DATED : April 25, 2017  
INVENTOR(S) : Pykkonen et al.

Page 1 of 1

It is certified that error appears in the above-identified patent and that said Letters Patent is hereby corrected as shown below:

In the Specification

Column 7, Line 2, delete "and fraction" and substitute therefore -- and traction --; and Column 7, Line 10, delete "fraction bus" and substitute therefore -- traction bus --.

Column 9, Line 66, delete "fraction bus" and substitute therefore -- traction bus --.

Column 11, Line 28, delete "fraction motor" and substitute therefore -- traction motor --.

Column 13, Line 13, delete "fraction motor" and substitute therefore -- traction motor --.

Column 16, Line 6, delete "fraction alternator" and substitute therefore -- traction alternator --.

Column 29, Line 40, delete "fraction motor" and substitute therefore -- traction motor --.

Column 30, Line 7, delete "existing frac-" and substitute therefore -- existing trac- --.

Signed and Sealed this  
Eleventh Day of July, 2017

Joseph Matal  
*Performing the Functions and Duties of the*  
*Under Secretary of Commerce for Intellectual Property and*  
*Director of the United States Patent and Trademark Office*